United States Patent
Miyazaki et al.

(10) Patent No.: US 11,972,908 B2
(45) Date of Patent: Apr. 30, 2024

(54) SOLID ELECTROLYTIC CAPACITOR WITH CONDUCTIVE POLYMER LAYER ATTAINING EXCELLENT METAL ION MIGRATION RESISTANCE

(71) Applicant: Heraeus Deutschland Gmbh & Co. KG, Hanau (DE)

(72) Inventors: Yayoi Miyazaki, Tokyo (JP); Akio Ishikawa, Tokyo (JP); Udo Merker, Hanau (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 165 days.

(21) Appl. No.: 17/630,368

(22) PCT Filed: Jul. 30, 2020

(86) PCT No.: PCT/EP2020/071483
§ 371 (c)(1),
(2) Date: Jan. 26, 2022

(87) PCT Pub. No.: WO2021/018999
PCT Pub. Date: Feb. 4, 2021

(65) Prior Publication Data
US 2022/0262575 A1    Aug. 18, 2022

(30) Foreign Application Priority Data

Aug. 1, 2019 (EP) .................... 19189693
Dec. 20, 2019 (EP) .................... 19219005

(51) Int. Cl.
*H01G 9/025* (2006.01)
*H01G 9/00* (2006.01)
*H01G 9/15* (2006.01)

(52) U.S. Cl.
CPC .......... *H01G 9/025* (2013.01); *H01G 9/0036* (2013.01); *H01G 9/15* (2013.01)

(58) Field of Classification Search
None
See application file for complete search history.

(56) References Cited

U.S. PATENT DOCUMENTS

| | | | |
|---|---|---|---|
| 2007/0171597 A1* | 7/2007 | Merker | H01G 11/48 361/523 |
| 2012/0107726 A1* | 5/2012 | Ogata | H01M 10/0525 257/E51.026 |

(Continued)

FOREIGN PATENT DOCUMENTS

| | | | | |
|---|---|---|---|---|
| CN | 102439670 A | * | 5/2012 | ............. H01G 9/012 |
| CN | 108335909 A | * | 7/2018 | ........... H01G 9/0003 |

(Continued)

OTHER PUBLICATIONS

Houben-Weyl—Methoden Der Organischen Chemie [Methods of Organic Chemistry] "Band E20 Makromolekulare Stoffe" [vol. E 20 Macromolecular Substances], part 2 , published by Herbert Bartle and Jürgen Falke, pp. 1141-1144 ("Polymerisation of Acrylic Acid or its Esters" "x) of acrylic compounds / x1) of acrylic acids or their esters" edited by Dr. Gunter Schroder) (machine English translation provided) (1987).

(Continued)

*Primary Examiner* — Dion R. Ferguson
(74) *Attorney, Agent, or Firm* — Panitch Schwarze Belisario & Nadel LLP

(57) ABSTRACT

The present invention relates to a capacitor comprising i) an electrode body comprising an electrode material, wherein a dielectric layer comprising a dielectric material at least partially covers a surface of the electrode body; ii) a solid electrolyte layer comprising a solid electrolyte material that at least partially covers a surface of the dielectric layer, (Continued)

wherein the solid electrolyte material comprises a conductive polymer; iii) an anode contact that is in contact with the electrode body and that comprises copper, metal-plated copper or a copper-containing alloy; and iv) a cathode contact that is in contact with the solid electrolyte layer; wherein the capacitor further comprises at least one metal ion migration inhibitor. The present invention also relates to a process for the production of a capacitor, to a capacitor obtainable by such a process, to electronic circuit comprising the capacitor according to present invention and to the use of these capacitors in electronic circuits.

14 Claims, 8 Drawing Sheets

(56) References Cited

U.S. PATENT DOCUMENTS

| | | | | |
|---|---|---|---|---|
| 2015/0213961 A1* | 7/2015 | Liu | ............ | H01G 9/012 |
| | | | | 29/25.03 |
| 2015/0337061 A1* | 11/2015 | Yano | ............ | C07D 495/04 |
| | | | | 526/135 |
| 2017/0236647 A1* | 8/2017 | Intelmann | ............ | H01G 9/0036 |
| | | | | 427/80 |
| 2018/0061585 A1* | 3/2018 | Harada | ............ | H01G 9/07 |
| 2018/0211787 A1* | 7/2018 | Saito | ............ | H01G 9/15 |
| 2019/0318880 A1* | 10/2019 | Petrzilek | ............ | H01G 9/0032 |
| 2022/0262575 A1* | 8/2022 | Miyazaki | ............ | H01G 9/0036 |

FOREIGN PATENT DOCUMENTS

| | | | | | |
|---|---|---|---|---|---|
| JP | 2017063158 A | | 3/2017 | | |
| JP | 2018117078 A | * | 7/2018 | ............ | H01G 9/0003 |
| WO | 2010089111 A1 | | 8/2010 | | |
| WO | 2014048562 A2 | | 4/2014 | | |
| WO | 2015181347 A1 | | 12/2015 | | |
| WO | 2015181348 A1 | | 12/2015 | | |
| WO | WO-2020153451 A1 | * | 7/2020 | ............ | H01G 9/012 |

OTHER PUBLICATIONS

International Search Report and Written Opinion dated Nov. 6, 2020 by the European Patent Office in its capacity as the International Searching Authority for counterpart international patent application No. PCT/EP2020/071483.

* cited by examiner

100

100

100

103

100

103a 103b

100

118   103a   103b ns/ SOLID ELECTROLYTIC CAPACITOR WITH
CONDUCTIVE POLYMER LAYER
ATTAINING EXCELLENT METAL ION
MIGRATION RESISTANCE

The present invention relates to a capacitor comprising an electrode body comprising i) an electrode material, wherein a dielectric layer comprising a dielectric material at least partially covers a surface of the electrode body, ii) a solid electrolyte layer comprising a solid electrolyte material that at least partially covers a surface of the dielectric layer, wherein the solid electrolyte material comprises a conductive polymer, iii) an anode contact that is in contact with the electrode body and that comprises copper, metal-plated copper or a copper-containing alloy and iv) a cathode contact that is in contact with the solid electrolyte layer. The present invention also relates to a process for the production of a capacitor, to a capacitor obtainable by such a process, to electronic circuit comprising the capacitor according to present invention and to the use of these capacitors in electronic circuits.

Most electronic circuits contain capacitors. These devices store and release electrical charge in response to circuit currents, resulting in predictable increases and decreases of voltage across their terminals. It is this predictable and limited short-term variation of terminal voltage that makes capacitors useful for example as decoupling and filtering devices in electronic circuits. Specifically, capacitors are useful in circuit locations where one does not want the voltage to change rapidly. One excellent use of capacitors is to minimize or "filter-out" both random and periodic fluctuations from the output stage of direct-current (DC) power supplies.

One example of a typical capacitor is a tantalum capacitor, that—just like any other electrolytic capacitor—comprises an anode, some electrolyte material and a The anode is isolated from the cathode so only a very small leakage DC current may flow through the capacitor. The anode is made of pure tantalum metal. The metal is used in form of a fine powder and sintered into a pellet at high temperatures. This forms a very porous electrode body with a high surface area. A high surface area directly translates to an increased capacitance value. The electrode body is then covered with a layer of insulating oxide, which acts as a dielectric material. This process is called anodization. In the case of a solid tantalum capacitors a solid electrolyte material is then added to the anode by means of pyrolysis (in case of manganese dioxide) or by impregnating the porous anode with a solution or dispersion comprising conductive polymers such as a complex of poly(3,4-ethylene-dioxythiophene) and polystyrene sulfonic acid or comprising monomers of conductive polymers such as 3,4-ethylenedioxythiophene which are then polymerized in situ within the electrode body to form the cathode. After the pellet used in solid tantalum capacitors is dipped into carbon and silver to provide a good cathode connection, the anode (usually via a tantalum wire that has been inserted into the electrode body) and the cathode (via the silver layer) are connected to an anode and a cathode contact (for example a lead frame), via which the capacitor is connected to the corresponding contacts of the electronic device into which they are integrated. A multi-layer aluminium capacitor is a further example of a typical solid electrolyte capacitor. It has a similar construction as the tantalum capacitor, with the main difference that instead of an electrode body that is based on sintered tantalum powder a porous aluminium foil is used, which is usually directly contacted with the anode lead frame.

Often, anode lead frames are used that comprise copper as the electrically conductive material. As the anode lead frame in a common tantalum capacitor or a multilayer aluminium capacitor is often located in the immediate vicinity of the solid electrolyte (as this is indicated in the dotted box shown in FIGS. 1 and 3), problems may arise particularly in case of capacitors comprising conductive polymers as the solid electrolyte material if moisture penetrates the space between the copper lead frame and the solid electrolyte, for example when the capacitors are stored or operated in a humid environment. Conductive polymers such as PEDOT/PSS often comprise a significant amount of ionic species such as $H^+$, $Na^+$ and $SO_4^{2-}$ which to a certain extend migrate into the humidified space between the copper lead frame and the solid electrolyte, which in turn leads to the formation of a "conductive bridge" between these structures. If under these conditions an electric field is applied between the anode and the cathode, copper ions tend to migrate from the anode lead frame to the solid electrolyte, where they are reduced and are thus deposited under the formation of a steadily growing copper dendrite. The accumulation of copper dendrite in the cathode area finally increases the risk of short-circuits in the capacitor.

One approach of avoiding the migration of ions in electronic devices is to reduce the content of ions in conductive polymer layers as it is, for example, disclosed in JP 2017/063158 A1. As stated above, conductive polymer layers such as PEDOT/PSS often comprise significant amounts of ionic species such as $H^+$, $Na^+$ and $SO_4^{2-}$. Although these ionic impurities can at least partially be extracted by washing these layers with water, the disadvantages in case of PEDOT/PSS-layers is that these layers swell upon contact with water which in turn significantly effects the exact dimensions of the solid electrolyte layer and thus also the electrical properties of the capacitor.

The present invention was based on the object of overcoming the disadvantages resulting from the prior art in connection with capacitors, in particular in connection with solid electrolyte capacitors, very particularly preferably in connection with tantalum capacitors and aluminium capacitors, even more preferably in connection with tantalum capacitors known from the prior art, which comprise a polythiophene-containing solid electrolyte layer and an anode contact that is based on copper, a metal-plated copper or a copper-containing alloy.

In particular, the present invention was based on the object of providing a solid electrolyte capacitor, very particularly preferably a tantalum capacitor or an aluminium capacitor, even more preferably a tantalum capacitor that comprises a polythiophene-containing solid electrolyte layer and an anode contact that is based on copper, a metal-plated copper or a copper-containing alloy, wherein this capacitor is characterized by a reduced risk of short-circuits after operation in a humid atmosphere.

The present invention was also based on the object of providing process of the preparation of a solid electrolyte capacitor the solid electrolyte layer of which comprises polythiophenes, wherein it is not required to reduce the content of ions such as $H^+$, $Na^+$ or $SO_4^{2-}$ in the solid electrolyte layer in an extra process step.

A contribution to at least partly solving at least one, preferably more than one, of the above objects is made by the independent claims. The dependent claims provide preferred embodiments which contribute to at least partly solving at least one of the objects.

A contribution to solving at least one of the objects according to the invention is made by an embodiment 1 of a capacitor 1 comprising
i) an electrode body comprising an electrode material, wherein a dielectric layer comprising a dielectric material at least partially covers a surface of the electrode body;
ii) a solid electrolyte layer comprising a solid electrolyte material that at least partially covers a surface of the dielectric layer, wherein the solid electrolyte material comprises a conductive polymer;
iii) an anode contact, preferably an anode lead frame, that is in contact, preferably in electrically conductive contact, with the electrode body and that comprises copper, metal-plated copper or a copper-containing alloy; and
iv) a cathode contact, preferably a cathode lead frame, that is in contact, preferably in electrically conductive contact, with the solid electrolyte layer;
wherein the capacitor further comprises at least one metal ion migration inhibitor.

In the expression "a solid electrolyte material that at least partially covers a surface of the dielectric layer" the term "covers" has to be understood in its broadest sense and particularly in such a way that the solid electrolyte layer must not necessarily be in direct contact with at least a part of the dielectric layer, but may also be separated from the dielectric layer by means of an intermediate layer, such as a layer that comprises an adhesion promoter. Suitable adhesion promoters are silans, such as organofunctional silanes or their hydrolysates, e.g. 3-glycidoxypropyltrialkoxysilane, 3-aminopropyltriethoxysilane, 3-mercaptopropyltrimethoxysilane, 3-metacryloxypropyltrimethoxysilane, vinyltrimethoxysilane or octyltriethoxysilane, and/or one or more other functional layers are applied to the dielectric layer of the electrical body.

In the expressions "an anode contact that is in contact, preferably in electrically conductive contact, with the electrode body" and "a cathode contact that is in contact, preferably in electrically conductive contact, with the solid electrolyte layer" the term "in contact" also has to be understood in its broadest sense and particularly in such a way that the anode contact and the cathode contact do not necessarily have to be in direct contact with the electrode body and the solid electrolyte layer, respectively. Further electrically conductive elements may be located between the anode contact and the electrode body and/or between the cathode contact and the solid electrolyte layer. For example, there may be an anode wire between the anode contact and the electrode body and/or there may be graphite and/or Ag layer between the cathode contact and the solid electrolyte layer.

In an embodiment 2 of the capacitor 1 according to the invention, the capacitor 1 is designed according to its embodiment 1, wherein the at least one metal ion migration inhibitor is localized at least in the area between the anode contact and the solid electrolyte layer or is localized within the solid electrolyte layer.

In an embodiment 3 of the capacitor 1 according to the invention, the capacitor 1 is designed according to its embodiment 1 or 2, wherein the capacitor is a tantalum capacitor. Preferably, such a tantalum capacitor comprises tantalum as the electrode material and tantalum oxide as the dielectric material.

In an embodiment 4 of the capacitor 1 according to the invention, the capacitor 1 is designed according to its embodiment 3, wherein the capacitor further comprises the following additional components:
v) a tantalum wire or ribbon that is in contact, preferably in electrically conductive contact, with the electrode material;
vi) optionally a first conductive layer that is in contact, preferably in electrically conductive contact, with the solid electrolyte layer, wherein the first conductive layer preferably is a carbon layer;
vii) a second conductive layer that is in contact, preferably in electrically conductive contact, with the solid electrolyte layer or the first conductive layer, wherein the second conductive layer is a metal layer, preferably is a silver layer;
viii) optionally an insulative layer that is located on at least a part of the surface of the tantalum wire or ribbon and by means of which an electrically conductive contact between the tantalum wire or ribbon and the solid electrolyte layer, the first conductive layer and the second conductive layer is avoided;
ix) optionally a covering layer that covers at least a part of the area between anode contact and the solid electrolyte layer.

In an embodiment 5 of the capacitor 1 according to the invention, the capacitor 1 is designed according to its embodiment 4, wherein the at least one metal ion migration inhibitor is localized at least at part of one, preferably of two or more of the following positions:
  on the surface of the anode contact;
  on the surface of the dielectric layer covering the electrode body;
  on the surface of the covering layer;
  on the surface of the tantalum wire or ribbon;
  on the surface of or within the insulative layer;
  on the surface of the first conductive layer that faces towards the solid electrolyte layer or on the surface of the first conductive layer that faces away from the solid electrolyte layer;
  on the surface of the second conductive layer that faces towards the first conductive layer or on the surface of the second conductive layer that faces away from the first conductive layer;
  on the surface of the solid electrolyte layer and/or within the solid electrolyte layer;
  within the first conductive layer;
  within the second conductive layer.

In an embodiment 6 of the capacitor 1 according to the invention, the capacitor 1 is designed according to its embodiment 1 or 2, wherein the capacitor is an aluminium capacitor, preferably a multi-layer aluminium capacitor that comprises one aluminium sheet or multiple sheets that are stacked. Preferably, such an aluminium capacitor comprises aluminium as the electrode material and aluminium oxide as the dielectric material.

In an embodiment 7 of the capacitor 1 according to the invention, the capacitor 1 is designed according to its embodiment 6, wherein the capacitor further comprises the following additional components:
v) optionally a first conductive layer that is in contact, preferably in electrically conductive contact, with the solid electrolyte layer, wherein the first conductive layer preferably is a carbon layer;
vi) a second conductive layer that is in contact, preferably in electrically conductive contact, with the solid electrolyte layer or the first conductive layer, wherein the second conductive layer is a metal layer, preferably a silver layer;

vii) optionally an insulative layer that is located on at least a part of the surface of the electrode body or on part of the dielectric layer means of which an electrically conductive contact between the electrode body and the solid electrolyte layer, the first conductive layer and the second conductive layer is avoided;

viii) optionally a covering layer that covers at least a part of the area between the anode contact and the solid electrolyte layer In an embodiment 8 of the capacitor 1 according to the invention, the capacitor 1 is designed according to its embodiment 7, wherein the at least one metal ion migration inhibitor is localized at least at part of one, preferably of two or more of the following positions:
- on the surface of the anode contact;
- on the surface of the dielectric layer covering the electrode body;
- on the surface of the electrode body;
- on the surface of the covering layer;
- on the surface of or within the insulative layer;
- on the surface of the first conductive layer that faces towards the solid electrolyte layer or on the surface of the first conductive layer that faces away from the solid electrolyte layer;
- on the surface of the second conductive layer that faces towards the first conductive layer or on the surface of the second conductive layer that faces away from the first conductive layer;
- on the surface of the solid electrolyte layer and/or within the solid electrolyte layer;
- within the first conductive layer;
- within the second conductive layer.

In an embodiment 9 of the capacitor 1 according to the invention, the capacitor 1 is designed according to anyone of its embodiments 1 to 8, wherein the at least one metal ion migration inhibitor is localized at least on a part of the surface of the solid electrolyte layer and/or is localized within at least a part of the solid electrolyte layer.

In an embodiment 10 of the capacitor 1 according to the invention, the capacitor 1 is designed according to anyone of its embodiments 1 to 9, wherein the solid electrolyte layer comprises a first solid electrolyte layer that follows the dielectric layer and second solid electrolyte layer that follows the first solid electrolyte layer, wherein the first and the second solid electrolyte layer both comprise a conductive polymer as the solid electrolyte material.

In an embodiment 11 of the capacitor 1 according to the invention, the capacitor 1 is designed according to its embodiment 10, wherein at least one of the following conditions is fulfilled:
a) the at least one metal ion migration inhibitor is localized within at least a part of the first solid electrolyte layer;
b) the at least one metal ion migration inhibitor is localized within at least a part of the second solid electrolyte layer;
c) the at least one metal ion migration inhibitor is localized on at least a part of the surface of the first solid electrolyte layer that is directed towards the second solid electrolyte layer;
d) the at least one metal ion migration inhibitor is localized on at least a part of the surface of the second solid electrolyte layer that faces away from the first solid electrolyte layer;
e) the at least one metal ion migration inhibitor is localized on at least a part of the surface of the dielectric layer.

In an embodiment 12 of the capacitor 1 according to the invention, the capacitor 1 is designed according to anyone of its embodiments 1 to 11, wherein the conductive polymer comprises a polythiophene.

In an embodiment 13 of the capacitor 1 according to the invention, the capacitor 1 is designed according to its embodiment 12, wherein the polythiophene is a foreign-doped polythiophene, preferably a cationic polythiophene that is present in the form of a polythiophene-/polyanion-complex, a self-doped polythiophene or a mixture thereof. Preferably, the conductive polymer comprises a complex of poly(3,4-ethylenedioxythiophene) and polystyrene sulfonic acid (PEDOT/PSS), poly(4-[(2,3-dihydrothieno[3,4-b]-[1,4]dioxin-2-yl)methoxy]propane-1-sulfonic acid), poly(4-[(2,3-dihydrothieno[3,4-b][1,4]dioxin-2-yl)methoxy]butane-1-sulfonic acid) (PEDOT-S), poly(4-[(2,3-dihydrothieno[3,4-b][1,4]dioxin-2-yl)methoxy]butane-2-sulfonic acid) or a mixture thereof.

In an embodiment 14 of the capacitor 1 according to the invention, the capacitor 1 is designed according to anyone of its embodiments 1 to 13, wherein the at least one metal ion migration inhibitor is selected from the group consisting of azoles or derivatives thereof, azines or derivatives thereof and amines.

In an embodiment 15 of the capacitor 1 according to the invention, the capacitor 1 is designed according to its embodiment 14, wherein the azole is selected from the group consisting of 4-methylimidazole, 4-methyl-5-imidazole-carbaldehyde, ethyl-4-methyl-imidazolecarboxylate, 4-methyl-1(4-methoxy-phenyl)imidazole, benzimidazole, (mercapto-benzimidazole) pyrazole, 2-undecylimidazol, poly-N-vinylimidazole, 1,2,3-triazole, 1,2,4-triazole, 5-methyl-1H-benzotriazole, tetrazole, pentazole, oxazole, isoxazole, 1,2,3-oxadiazole, 1,2,4-oxadiazole, 1,2,5-oxadiazole, 1,3,4-oxadiazole, thiazole, isothiazole, 1,2,3-thiadiazole, 1,2,4-thiadiazole, 1,2,5-thiadiazole, 1,3,4-thiadiazole, 2-amino-5-ethylthio-1,3,4-thiadiazole, 2-amino-5-ethyl-1,3,4-thiadiazole, 3-amino-5-methyl-thio-1,2,4-triazole, 1-(p-tolyl)-4-methylimidazole, 1-phenyl-4-methylimidazole, 4-methyl-5-hydroxymethylimidazole, (2-mercapto-1-methylimidazole), 5-mercapto-1-phenyl-1H-tetrazole, 2-(3,5-di-ter-butyl-2-hydroxyphenyl)benzotriazole and derivatives of these azoles.

In an embodiment 16 of the capacitor 1 according to the invention, the capacitor 1 is designed according to its embodiment 15, wherein the azole is selected from the group consisting of 1,2,4-triazole, 5-methyl-1H-benzotriazole and derivatives or mixtures thereof.

In an embodiment 17 of the capacitor 1 according to the invention, the capacitor 1 is designed according to its embodiment 16, wherein the azole is 5-methyl-1H-benzotriazole or a derivative thereof.

In an embodiment 18 of the capacitor 1 according to the invention, the capacitor 1 is designed according to its embodiment 14, wherein the azole is selected from the group consisting of bismuthiol (1,5-dimercapto-1,3,4-thiadiazole), benzoxazole, 2-ethyl-4-methylimidazole, 1-allylimidazole, 4-methyl-2-phenylimidazole, 1-propylimidazole and derivatives of these azoles, preferably selected from the group consisting of bismuthiol, benzoxazole and 4-methyl-2-phenylimidazole.

In an embodiment 19 of the capacitor 1 according to the invention, the capacitor 1 is designed according to its embodiment 14, wherein the azine is selected from the group consisting of aromatic hydrazines, oxines, pyridines, pyridazine, pyrimidine, pyrazine, triazone, tetrazine and derivatives of these azines.

In an embodiment 20 of the capacitor 1 according to the invention, the capacitor 1 is designed according to its embodiment 19, wherein the azine is selected from the group consisting of pyrazine-2,3-dicarboxamide, pyridine-2-amine, 3-amino-pyrazine-2-carboxylic acid, pyridine-2,3-diamine, pyrazine-2-amine, 2-(3-phenyl-4,5-dihydro-1H-pyrazol-5-yl)pyridine, 2-(3-phenyl-4,5-dihydro-1,2-oxazol-5-yl)-pyridine and 1,2-bis(4-chloro-benzy-lidene)azine.

In an embodiment 21 of the capacitor 1 according to the invention, the capacitor 1 is designed according to its embodiment 19, wherein the azine is selected from the group consisting of 2-methyl-8-quinolinole, allopurinol (1H-Pyrazolo[3,4-d]pyrimidin-4-one), 2-amino-5-methylpyridine, benzoguanamine, 2,3-dimethylpyrazine, thiocyanuric acid and derivatives of these azines, preferably selected from the group consisting of allopurinol, benzoguanamine, 2,3-dimethylpyrazine and thiocyanuric acid.

In an embodiment 22 of the capacitor 1 according to the invention, the capacitor 1 is designed according to its embodiment 14, wherein the amine is selected from the group consisting of ethanolamine, ethylamine, butylamine, isopropylamine, triethanolamine, aniline, benzylamine, octylamine, 2-ethylhexylamine, (N-(2-furfuryl)p-toluidine), (N-(5-chloro-2-furfuryl)-p-toluidine), (N-(5-bromo-2-furfuryl)-p-toluidine), (N-(5-nitro-2-furfuryl)-p-toluidine), (N-(5-methyl-2-furfuryl)-p-toluidine), N-methyl-p-toluidine, 2-(3-methoxyphenyl)ethylamine and 2-ethylhexylamine.

In an embodiment 23 of the capacitor 1 according to the invention, the capacitor 1 is designed according to anyone of its embodiment 1 to 22, wherein the amount of metal ion migration inhibitor in the capacitor is 1 ppm to 10%, preferably 5 ppm to 1%, more preferably 10 ppm to 0.1%, in each case based on the total weight of capacitor. The amount of metal ion migration inhibitor in the solid electrolyte layer, preferably at least in the second solid electrolyte layer, is preferably in the range from 0.05% to 90%, preferably 1% to 75%, more preferably in the range from 5% to 50%, in each case based on weight of solid electrolyte layer, preferably based on the weight of the second solid electrolyte layer.

In an embodiment 24 of the capacitor 1 according to the invention, the capacitor 1 is designed according to anyone of its embodiment 1 to 23, wherein the metal-plated copper is selected from the group consisting of
Cu/Ni [Ni-Plated Cu]
Cu/Ni/Pd [Pd-plated Cu/Ni]
Cu/Ni/Pd/Au [Au-plated Cu/Ni/Pd]
Cu/Ni/Au [Au-plated Cu/Ni]
Cu/Au [Au-plated Cu]
Cu/Pd [Pd-plated Cu]
Cu/Ni/Sn [Sn plated Cu/Ni]
Cu/Ni—Sn [Ni—Sn alloy plated Cu]
Cu/Sn [Sn plated Cu]
Cu/(Ni/)Cu—Sn [Cu—Sn alloy plated Cu].

In an embodiment 25 of the capacitor 1 according to the invention, the capacitor 1 is designed according to anyone of its embodiment 1 to 24, wherein the copper alloy is selected from the group consisting of Cu—Sn—P, Cu—Ni—Sn and Cu—Sn—Ni—Zn.

A contribution to solving at least one of the objects according to the invention is made by an embodiment 1 of a process for making an item, preferably a capacitor, more preferably a capacitor 1 according to the invention, comprising the process steps:

I) providing an electrode body comprising an electrode material, wherein a dielectric comprising a dielectric material covers a surface of this electrode material at least partially;

II) depositing a solid electrolyte layer comprising a solid electrolyte material onto at least a part of a surface of the dielectric layer, wherein the solid electrolyte material comprises a conductive polymer;

III) bringing the electrode body in contact, preferably into electrically conductive contact, with an anode contact, preferably with an anode lead frame, that comprises copper, metal-plated copper or a copper-containing alloy; and IV) bringing the solid electrolyte layer in contact, preferably into electrically conductive contact, with a cathode contact, preferably with a cathode lead frame;

wherein at least one metal ion migration inhibitor is introduced into the capacitor.

The expression "depositing a solid electrolyte layer comprising a solid electrolyte material onto at least apart of a surface of the dielectric layer" has to be understood in its broadest sense and particularly in such a way that the solid electrolyte layer must not necessarily be deposited directly onto at least a part of the dielectric layer, but may also be deposited onto an intermediate layer that has been previously applied onto the dielectric layer, such as a layer that comprises an adhesion promoter. Suitable adhesion promoters are again silanes, such as organofunctional silanes or their hydrolysates, e.g. 3-glycidoxypropyltrialkoxysilane, 3-aminopropyltriethoxysilane, 3-mercaptopropyltrimethoxysilane, 3-metacryloxypropyltrimethoxysilane, vinyltrimethoxysilane or octyltriethoxysilane, and/or one or more other functional layers are applied to the dielectric layer of the electrical body.

The expressions "bringing the electrode body in contact, preferably into electrically conductive contact, with an anode contact" and "bringing the solid electrolyte layer in contact, preferably into electrically conductive contact, with a cathode contact" also have to be understood in their broadest sense and particularly in such a way that the anode contact and the cathode contact do not necessarily have to be brought into direct contact with the electrode body and the solid electrolyte layer, respectively. Further electrically conductive elements may be located between the anode contact and the electrode body and/or between the cathode contact and the solid electrolyte layer. For example, there may be an anode wire between the anode contact and the electrode body and/or there may be graphite and/or Ag layer between the cathode contact and the solid electrolyte layer.

In an embodiment 2 of the process 1 according to the invention, the process 1 is designed according to its embodiment 1, wherein the at least one metal ion migration inhibitor is introduced into an area between the anode contact and the solid electrolyte layer or is introduced into the solid electrolyte layer.

In an embodiment 3 of the process 1 according to the invention, the process 1 is designed according to its embodiment 1 or 2, wherein the capacitor is a tantalum capacitor.

In an embodiment 4 of the process 1 according to the invention, the process 1 is designed according to its embodiment 3, wherein in process step I) tantalum powder is sintered to give a porous electrode body.

In an embodiment 5 of the process 1 according to the invention, the process 1 is designed according to anyone its embodiments 2 to 4, wherein the process comprises at least one of the following process steps:

V) providing an electrode body that comprises a tantalum wire or ribbon sticking out of the electrode body;
VI) optionally applying a first conductive layer onto at least a part of the solid electrolyte layer, wherein the first conductive layer preferably is a carbon layer;
VII) applying a second conductive layer onto at least a part of the solid electrolyte layer or onto at least a part of the first conductive layer, wherein the second conductive layer is a metal layer, preferably is a silver layer;
VIII) optionally applying an insulative layer onto on at least a part of the surface of the tantalum wire or ribbon in such a way that an electrically conductive contact between the tantalum wire or ribbon and the solid electrolyte layer, the first conductive layer and the second conductive layer is avoided;
IX) optionally applying a covering layer onto at least a part of the area between the anode contact and the solid electrolyte layer In an embodiment 6 of the process 1 according to the invention, the process 1 is designed according to its embodiment 5, wherein the at least one metal ion migration inhibitor is applied at least at a part of one, preferably of two or more of the following positions:
  on the surface of the anode contact;
  on the surface of the dielectric layer covering the electrode body;
  on the surface of the covering layer;
  on the surface of the tantalum wire or ribbon;
  on the surface of or within the insulative layer;
  on the surface of the first conductive layer that faces towards the solid electrolyte layer or on the surface of the first conductive layer that faces away from the solid electrolyte layer;
  on the surface of the second conductive layer that faces towards the first conductive layer or on the surface of the second conductive layer that faces away from the first conductive layer;
  on the surface of the solid electrolyte layer and/or, within the solid electrolyte layer;
  within the first conductive layer;
  within the second conductive layer.

In an embodiment 7 of the process 1 according to the invention, the process 1 is designed according to its embodiment 1 or 2, wherein the capacitor is an aluminium capacitor, preferably a multi-layer aluminium capacitor that comprises one aluminium sheet or multiple sheets that are stacked.

In an embodiment 8 of the process 1 according to the invention, the process 1 is designed according to its embodiment 7, wherein in process step I) an aluminium foil is etched to give a porous electrode body.

In an embodiment 9 of the process 1 according to the invention, the process 1 is designed according to its embodiments 7 or 8, wherein the process comprises at least one of the following process steps:
V) optionally applying a first conductive layer onto at least a part of the solid electrolyte layer, wherein the first conductive layer preferably is a carbon layer;
VI) applying a second conductive layer onto at least a part of the solid electrolyte layer or at least a part of the first conductive layer, wherein the second conductive layer is a metal layer, preferably a silver layer;
VII) optionally applying an insulative layer onto on at least a part of the surface of the electrode body or part of the dielectric layer in such a way that an electrically conductive contact between the electrode body and the solid electrolyte layer, the first conductive layer and the second conductive layer is avoided;
VIII) optionally applying a covering layer onto at least a part of the area between the anode contact and the solid electrolyte.

In an embodiment 10 of the process 1 according to the invention, the process 1 is designed according to its embodiment 9, wherein the at least one metal ion migration inhibitor is applied at least at part of one, preferably of two or more of the following positions:
  on the surface of the anode contact;
  on the surface of the dielectric layer covering the electrode body;
  on the surface of the electrode body;
  on the surface of the covering layer;
  on the surface of or within the insulative layer;
  onto the surface of the first conductive layer that faces towards the solid electrolyte layer or on the surface of the first conductive layer that faces away from the solid electrolyte layer;
  on the surface of the second conductive layer that faces towards the first conductive layer or on the surface of the second conductive layer that faces away from the first conductive layer;
  on the surface of the solid electrolyte layer and/or within the solid electrolyte layer;
  within the first conductive layer;
  within the second conductive layer.

In an embodiment 11 of the process 1 according to the invention, the process 1 is designed according to anyone of its embodiments 1 to 10, wherein the at least one metal ion migration inhibitor is applied onto the surface of the solid electrolyte layer and/or is introduced into the solid electrolyte layer.

In an embodiment 12 of the process 1 according to the invention, the process 1 is designed according to anyone of its embodiments 1 to 11, wherein in process step II) a first solid electrolyte layer is deposited onto at least a part of a surface of the dielectric layer, followed by the deposition of a second solid electrolyte layer onto at least a part of the first solid electrolyte layer, wherein the first and the second solid electrolyte layer both comprise a conductive polymer as the solid electrolyte material.

In an embodiment 13 of the process 1 according to the invention, the process 1 is designed according to its embodiment 12, wherein at least one of the following conditions is fulfilled:
A) during or after process step II) the at least one metal ion migration inhibitor is introduced into at least a part of the first solid electrolyte layer;
B) during or after process step II) the at least one metal ion migration inhibitor is introduced into at least a part of the second solid electrolyte layer;
C) during or after process step II) the at least one metal ion migration inhibitor is deposited onto at least a part of the surface of the first solid electrolyte layer that is directed towards the second solid electrolyte layer;
D) during or after process step II) the at least one metal ion migration inhibitor is deposited onto at least a part of the surface of the second solid electrolyte layer that faces away from the first solid electrolyte layer (103a).

In an embodiment 14 of the process 1 according to the invention, the process 1 is designed according to anyone of its embodiment 11 to 13, wherein deposition of the solid electrolyte layer or of the first solid electrolyte layer onto at least a part of a surface the dielectric layer in process step II) comprises the steps of
  contacting the electrode body obtained in process step I) with a liquid composition that comprises the conductive polymer an at least one solvent followed by an at least partial removal of the solvent, or a monomer used to prepare the conductive polymer and an oxidizer followed by an in situ-polymerization of the monomer, or a monomer used to prepare the conductive polymer followed by an electrochemical polymerization, for the formation of the solid electrolyte layer or of the first solid electrolyte layer;
and wherein the introduction of the at least one metal ion migration inhibitor into the solid electrolyte layer or into the first solid electrolyte layer or the application of the at least one metal ion migration inhibitor onto the surface of these layers is accomplished α) by adding the at least one metal ion migration inhibitor into the liquid composition that comprises the conductive polymer or the monomer or the oxidizer used to prepare the conductive polymer;
β) by bringing the solid electrolyte layer or the first solid electrolyte layer into contact with a composition that comprises the at least one metal ion migration inhibitor; or
γ) by a combination of approaches α) and β).

In an embodiment 15 of the process 1 according to the invention, the process 1 is designed according to anyone of its embodiment 12 to 14, wherein deposition of the second solid electrolyte layer onto at least a part of a surface the first solid electrolyte layer in process step II) comprises the steps of optionally contacting the electrode body onto which the first solid electrolyte layer has been deposited with a primer solution that comprises a primer compound and at least one solvent followed by an at least partial removal of the solvent for the formation of a primer layer;

contacting the electrode body onto which the first solid electrolyte layer has been deposited or contacting the electrode body onto which the first solid electrolyte layer and the primer layer have been deposited with a liquid composition that comprises the conductive polymer an at least one solvent followed by an at least partial removal of the solvent or with a monomer used to prepare the conductive polymer and an oxidizer followed by an in situ-polymerization of the monomer, or a monomer used to prepare the conductive polymer followed by an electrochemical polymerization, for the formation of the second solid electrolyte layer;

and wherein the introduction of the at least one metal ion migration inhibitor into the second solid electrolyte layer or the application of the at least one metal ion migration inhibitor onto the surface of this layers is accomplished α) by adding the at least one metal ion migration inhibitor into the primer solution;
β) by adding the at least one metal ion migration inhibitor into the liquid composition that comprises the conductive polymer or monomer or oxidizer used to prepare the conductive polymer;
γ) by bringing the second solid electrolyte layer into contact with a composition that comprises the at least one metal ion migration inhibitor; or
δ) by a combination of approaches α), β) and/or γ).

In an embodiment 16 of the process 1 according to the invention, the process 1 is designed according to anyone of its embodiments 1 to 15, wherein the conductive polymer comprises a polythiophene.

In an embodiment 17 of the process 1 according to the invention, the process 1 is designed according to its embodiment 16, wherein the polythiophene is a foreign-doped polythiophene, preferably a cationic polythiophene that is present in the form of a polythiophene-/polyanion-complex, a self-doped polythiophene or a mixture thereof. Preferably, the conductive polymer comprises a complex of poly(3,4-ethylene-dioxythiophene) and polystyrene sulfonic acid (PEDOT/PSS), poly(4-[(2,3-dihydrothieno[3,4-b]-[1,4]dioxin-2-yl)methoxy]propane-1-sulfonic acid), poly(4-[(2,3-dihydrothieno[3,4-b][1,4]dioxin-2-yl)methoxy]butane-1-sulfonic acid) (PEDOT-S), poly(4-[(2,3-dihydrothieno[3,4-b][1,4]dioxin-2-yl)methoxy]butane-2-sulfonic acid) or a mixture thereof.

In an embodiment 18 of the process 1 according to the invention, the process 1 is designed according to anyone of its embodiments 1 to 17, wherein the at least one metal ion migration inhibitor is selected from the group consisting of azoles or derivatives thereof, azines or derivatives thereof and amines.

In an embodiment 19 of the process 1 according to the invention, the process 1 is designed according to its embodiment 18, wherein the azole is selected from the group consisting of 4-methylimidazole, 4-methyl-5-imidazolecarbaldehyde, ethyl-4-methyl-imidazolecarboxylate, 4-methyl-1-(4-methoxyphenyl)imidazole, benzimidazole, (mercapto-benzimidazole) pyrazole, 2-undecylimidazol, poly-N-vinylimidazole, 1,2,3-triazole, 1,2,4-triazole, 5-methyl-1H-benzotriazole, tetrazole, pentazole, oxazole, isoxazole, 1,2,3-oxadiazole, 1,2,4-oxadiazole, 1,2,5-oxadiazole, 1,3,4-oxadiazole, thiazole, isothiazole, 1,2,3-thiadiazole, 1,2,4-thiadiazole, 1,2,5-thiadiazole, 1,3,4-thiadiazole, 2-amino-5-ethylthio-1,3,4-thiadiazole, 2-amino-5-ethyl-1,3,4-thiadiazole, 3-amino-5-methyl-thio-1,2,4-triazole, 1-(p-tolyl)-4-methylimidazole, 1-phenyl-4-methylimidazole, 4-methyl-5-hydroxymethylimidazole, (2-mercapto-1-methylimidazole), 5-mercapto-1-phenyl-1H-tetrazole, 2-(3,5-di-ter-butyl-2-hydrxyphenyl)benzotriazole and derivatives of these azoles.

In an embodiment 20 of the process 1 according to the invention, the process 1 is designed according to its embodiment 19, wherein the azole is selected from the group consisting of 1,2,4-triazole, 5-methyl-1H-benzotriazole and derivatives or mixtures thereof.

In an embodiment 21 of the process 1 according to the invention, the process 1 is designed according to its embodiment 20, wherein the azole is 5-methyl-1H-benzotriazole or a derivative thereof.

In an embodiment 22 of the process 1 according to the invention, the process 1 is designed according to its embodiment 18, wherein the azole is selected from the group consisting of bismuthiol (1,5-dimercapto-1,3,4-thiadiazole), benzoxazole, 2-ethyl-4-methylimidazole, 1-allylimidazole, 4-methyl-2-phenylimidazole, 1-propylimidazole and derivatives of these azoles, preferably selected from the group consisting of bismuthiol, benzoxazole and 4-methyl-2-phenylimidazole.

In an embodiment 23 of the process 1 according to the invention, the process 1 is designed according to its embodiment 18, wherein the azine is selected from the group consisting of aromatic hydrazines, oxines, pyridines, pyridazine, pyrimidine, pyrazine, triazone, tetrazine and derivatives of these azines.

In an embodiment 24 of the process 1 according to the invention, the process 1 is designed according to its embodiment 23, wherein the azine is selected from the group consisting of pyrazine-2,3-dicarboxamide, pyridine-2-amine, 3-amino-pyrazine2-carboxylic acid, pyridine-2,3-diamine, pyrazine-2-amine, 2-(3-phenyl-4,5-dihydro-1H- pyrazol-5-yl)pyridine, 2-(3-phenyl-4,5-dihydro-1,2-oxazol-5-yl)-pyridine and 1,2-bis(4-chloro-benzy-lidene)azine.

In an embodiment 25 of the process 1 according to the invention, the process 1 is designed according to its embodiment 18, wherein the azine is selected from the group consisting of 2-methyl-8-quinolinole, allopurinol (1H-Pyrazolo[3,4-d]pyrimidin-4-one), 2-amino-5-methylpyridine, benzoguanamine, 2,3-dimethylpyrazine, thiocyanuric acid and derivatives of these azines, preferably selected from the group consisting of allopurinol, benzoguanamine, 2,3-dimethylpyrazine and thiocyanuric acid.

In an embodiment 26 of the process 1 according to the invention, the process 1 is designed according to its embodiment 18, wherein the amine is selected from the group consisting of ethanolamine, ethylamine, butylamine, isopropylamine, triethanolamine, aniline, benzylamine, octylamine, 2-ethylhexylamine, (N-(2-furfuryl)p-toluidine), (N-(5-chloro-2-furfuryl)-p-toluidine), (N-(5-bromo-2-furfuryl)-p-toluidine), (N-(5-nitro-2-furfuryl)-p-toluidine), (N-(5-methyl-2-furfuryl)-p-toluidine), N-methyl-p-toluidine, 2-(3-methoxyphenyl)ethylamine and 2-ethylhexylamine.

In an embodiment 27 of the process 1 according to the invention, the process 1 is designed according to anyone of its embodiments 1 to 26, wherein the at least one metal ion migration inhibitor is introduced into the capacitor in an amount of 1 ppm to 10%, preferably 5 ppm to 1%, more preferably 10 ppm to 0.1%, in each case based on the total weight of capacitor. The at least one metal ion migration inhibitor is preferably introduced in the solid electrolyte layer, preferably at least into the second solid electrolyte layer, in an amount in the range from 0.05% to 90%, more preferably 1% to 75%, even more preferably in the range from 5% to 50%, in each case based on weight of solid electrolyte layer, preferably based on the weight of the second solid electrolyte layer.

In an embodiment 28 of the process 1 according to the invention, the process 1 is designed according to anyone of its embodiments 1 to 27, wherein the metal-plated copper is selected from the group consisting of Cu/Ni [Ni-Plated Cu]
Cu/Ni/Pd [Pd-plated Cu/Ni]
Cu/Ni/Pd/Au [Au-plated Cu/Ni/Pd]
Cu/Ni/Au [Au-plated Cu/Ni]
Cu/Au [Au-plated Cu]
Cu/Pd [Pd-plated Cu]
Cu/Ni/Sn [Sn plated Cu/Ni]
Cu/Ni—Sn [Ni—Sn alloy plated Cu]
Cu/Sn [Sn plated Cu]
Cu/(Ni/)Cu—Sn [Cu—Sn alloy plated Cu].

In an embodiment 29 of the process 1 according to the invention, the process 1 is designed according to anyone of its embodiments 1 to 28, wherein the copper alloy is selected from the group consisting of Cu—Sn—P, Cu—Ni—Sn and Cu—Sn—Ni—Zn.

A contribution to solving at least one of the objects according to the invention is made by an embodiment 1 of a capacitor 2 obtainable by the process of the invention according to any of its embodiments 1 to 29. In a preferred embodiment of the capacitor 2, this capacitor 2 shows the technical features of the capacitor 1 of the invention according to any of its embodiments.

A contribution to solving at least one of the objects according to the invention is also made by an embodiment 1 of an electronic circuit comprising a capacitor 1 according to anyone of its preferred embodiments or a capacitor 2 according to anyone of its preferred embodiments.

A contribution to solving at least one of the objects according to the invention is also made by the of a capacitor 1 according to anyone of its preferred embodiments or of a capacitor 2 according to anyone of its preferred embodiments in electronic circuits.

Electrode Body

In principle, the electrode body can be produced by pressing a valve metal powder of high surface area and sintering it to give a usually porous electrode body. An electrical contact wire or ribbon, preferably of a valve metal, such as e.g. tantalum, is conventionally also pressed into the electrode body here or welded onto the electrode body after sintering. The electrode body is then coated, for example by electrochemical oxidation, with the dielectric layer, i.e. an oxide layer. Alternatively, metal foils can also be etched, and coated with the dielectric layer by electrochemical oxidation in order to obtain an anode foil having a porous region. In a wound capacitor, an anode foil having a porous region, which forms the electrode body, and a cathode foil are separated by separators and wound up.

In the context of the invention, valve metal is to be understood as meaning those metals of which the oxide layers do not render possible current flow equally in both directions. In the case of an anodically applied voltage, the oxide layers of the valve metals block the current flow, while in the case of a cathodically applied voltage large currents occur, which may destroy the oxide layer. The valve metals include Be, Mg, Al, Ge, Si, Sn, Sb, Bi, Ti, Zr, Hf, V, Nb, Ta and W and an alloy or compound of at least one of these metals with other elements. The best-known representatives of the valve metals are Al, Ta and Nb. Compounds which have electrical properties comparable to a valve metal are those having metallic conductivity, which can be oxidized and of which the oxide layers have the properties described above. For example, NbO has metallic conductivity, but in general is not regarded as a valve metal. Layers of oxidized NbO have, however, the typical properties of valve metal oxide layers, so that NbO or an alloy or compound of NbO with other elements are typical examples of such compounds which have electrical properties comparable to a valve metal. Electrode bodies comprising tantalum, aluminium and those electrode materials based on niobium or niobium oxide are preferred. Tantalum and aluminium are very particularly preferred as the electrode material (and the corresponding oxides as the dielectric material).

For simplicity, bodies having a porous region are also called porous in the following. Thus, for example, electrode bodies having a porous region are also called porous electrode bodies. On the one hand, the porous bodies can be permeated by a plurality of channels and therefore be sponge-like. This is often the case if tantalum is used for construction of the capacitor. Furthermore, it is possible for only the surface to have pores and for the region following under the surface pores to be solid in construction. Such a situation is often observed if aluminium is used for construction of the capacitor. Preferably, the electrode body is porous.

The often porous electrode bodies produced in this manner are then oxidized, for example, in a suitable electrolyte, such as e.g. phosphoric acid or an aqueous solution of ammonium adipate, by application of a voltage, in order to form the dielectric layer. The level of this forming voltage depends on the oxide layer thickness to be achieved or the later use voltage of the capacitor. Preferred forming voltages lie in a range of from 1 to 500 V, particularly preferably in a range of from 2 to 150 V, very particularly preferably in a range of from 3 to 100 V.

The as a rule porous electrode bodies employed preferably have a porosity of from 10 to 90%, preferably from 30 to 80%, particularly preferably from 50 to 80% and an average pore diameter of from 10 to 10,000 nm, preferably from 20 to 5,000 nm, particularly preferably from 50 to 3,000 nm.

Solid Electrolyte Layer

The solid electrolyte layer in the capacitor according to the present invention comprises polymer, wherein it is preferred that the conductive polymer comprises a polythiophene. Preferred polythiophenes are those with repeat units of the general formula (I), of the general formula (II), of the general formula (III) or polythiophenes comprising combinations of these repeat units:

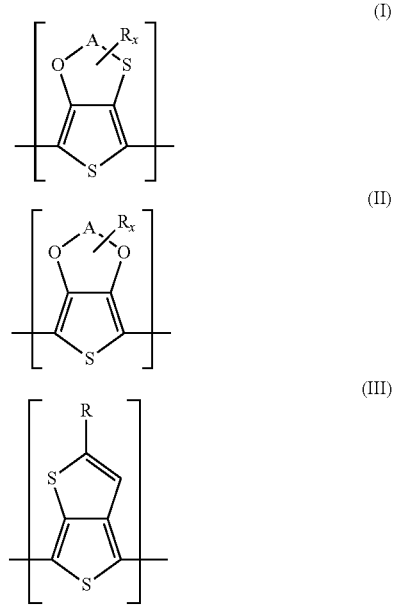

in which

A is an optionally substituted $C_1$-$C_5$-alkylene radical,

R is independently H, a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, x is an integer from 0 to 8 and, in the case that a plurality of R radicals are bonded to A, they may be the same or different.

The general formulae (I) and (II) should be understood such that x substituents R may be bonded to the alkylene radical A.

Particular preference is given to polythiophenes with repeat units of the general formula (I) or (II) or repeat units of the general formulae (I) and (II), in which A is an optionally substituted $C_2$-$C_3$-alkylene radical and x is 0 or 1. A very particularly preferred polythiophene is poly(3,4-ethylenedioxythiophene) (PEDOT), which is optionally substituted, as in poly(4-[(2,3-dihydrothieno[3,4-b]-[1,4]dioxin-2-yl)methoxy]propane-1-sulfonic acid), poly(4-[(2,3-dihydrothieno[3,4-b][1,4]dioxin-2-yl)methoxy]butane-1-sulfonic acid) (PEDOT-S) or poly(4-[(2,3-dihydrothieno[3,4-b][1,4]dioxin-2-yl)methoxy]butane-2-sulfonic acid).

In the context of the invention, the prefix "poly" should be understood to mean that more than one identical or different repeat unit is present in the polymer or polythiophene. The polythiophenes contain a total of n repeat units of the general formula (I) or of the general formula (II) or of the general formula (III) or of the general formulae (I) and (II) or of the general formulae (I) and (III) or of the general formulae (II) and (III) or of the general formulae (I), (II) and (III), where n is an integer of 2 to 2000, preferably 2 to 100. The repeat units of the general formula (I) or of the general formula (II) or of the general formula (III) or the repeat units of the general formulae (I) and (II) or the repeat units of the general formulae (I) and (III) or the repeat units of the general formulae (II) and (III) or the repeat units of the general formulae (I), (II) and (III) may each be the same or different within a polythiophene. Preference is given to polythiophenes having in each case identical repeat units of the general formula (I) or of the general formula (II) or of the general formula (III) or having in each case identical repeat units of the general formulae (I) and (II), or of the general formulae (I) and (III), or of the general formulae (II) and (III), or having in each case identical repeat units of the general formulae (I), (II) and (III). Particular preference is given to polythiophenes having in each case identical repeat units of the general formula (I) or of the general formula (II) or having in each case identical repeat units of the general formulae (I) and (II). At the end groups, the polythiophenes preferably each bear H.

In the context of the invention, $C_1$-$C_5$-alkylene radicals A are preferably methylene, ethylene, n-propylene, n-butylene or n-pentylene. $C_1$-$C_{18}$-Alkyl R is preferably linear or branched $C_1$-$C_{18}$-alkyl radicals such as methyl, ethyl, n- or isopropyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R are, for example, cyclopentyl, cyclohexyl, cycloheptyl, cyclooctyl, cyclononyl or cyclodecyl, $C_6$-$C_{14}$-aryl radicals R are, for example, phenyl or naphthyl, and $C_7$-$C_{15}$-aralkyl radicals R are, for example, benzyl, o-, m-, p-tolyl, 2,3-, 2,4-, 2,5-, 2,6-, 3,4-, 3,5-xylyl or mesityl. The above list serves to illustrate the invention by way of example and should not be considered to be exclusive.

In the context of the invention, any further substituents of the A radicals and/or of the R radicals include numerous organic groups, for example alkyl, cycloalkyl, aryl, aralkyl, alkoxy, halogen, ether, thioether, disulfide, sulfoxide, sulfone, sulfonate, amino, aldehyde, keto, carboxylic ester, carboxylic acid, carbonate, carboxylate, cyano, alkylsilane and alkoxysilane groups, and also carboxamide groups.

The polythiophenes may be uncharged or cationic. In preferred embodiments, they are cationic, "cationic" relating only to the charges which reside on the main polythiophene chain. According to the substituent on the R radicals, the polythiophenes may bear positive and negative charges in the structural unit, in which case the positive charges are on the main polythiophene chain and the negative charges are, if present, on the R radicals substituted by sulfonate or carboxylate groups. The positive charges of the main polythiophene chain may be partly or fully saturated by the anionic groups which may be present on the R radicals. Viewed overall, the polythiophenes in these cases may be cationic, uncharged or even anionic. Nevertheless, in the context of the invention, all are considered to be cationic polythiophenes, since the positive charges on the main polythiophene chain are crucial. The positive charges are not shown in the formulae, since their exact number and position cannot be stated unambiguously. The number of positive charges is, however, at least 1 and at most n, where n is the total number of all repeat units (identical or different) within the polythiophene.

The positive charge of the polythiophenes can be balanced by sulfonate- or carboxylate-substituted and thus negatively charged R radicals (so called "self-doped polythiophenes") or by counter-ions (so called "foreign-doped polythiophenes").

According to a first preferred embodiment of the polythiophenes which may be used for the formation of the solid electrolyte layer the polythiophenes are self-doped polythiophenes that preferably comprise, to the extent of at least 50%, still more preferably to the extent of at least 75%, still more preferably to the extent of at least 95% and most preferably to the extent of 100%, recurring units of the formula (I)

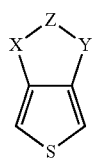

(I)

in which

X, Y are identical or different and denote O, S, N—$R^1$,
Z denotes —$(CH_2)_m$—$CR^2R^3$—$(CH_2)_n$—,
$R^1$ denotes aryl, $C_1$-$C_{18}$-alkyl or hydrogen,
$R^2$ denotes hydrogen, —$(CH_2)_s$—O—$(CR^4{}_2)_p$—$SO_3^-M^+$ or —$(CH_2)_p$—$SO_3^-M^+$,
$R^3$ denotes —$(CH_2)_s$—O—$(CR^4{}_2)_p$—$SO_3^-M^+$ or —$(CH_2)_p$—$SO_3^-M^+$,
$M^+$ denotes a cation,
m, n are identical or different and denote an integer from 0 to 3,
$R^4$ denotes hydrogen or a $C_1$-$C_{10}$ alkyl group, preferably a methyl group,
s denotes an integer from 0 to 10 and
p denotes an integer from 1 to 18.

The percentage figures stated above are intended in this context to express the numerical content of the units of the structural formula (I) in the total number of monomer units in the self-doped conductive polymer.

Suitable cations $M^+$ are e.g. $H^+$, $Li^+$, $Na^+$, $K^+$, $Rb^+$, $Cs^+$ and $NH4^+$. Particularly suitable cations are $Na^+$ and $K^+$.

Particularly preferred monomers of the structural formula (I) are those in which
X, Y denote O,
Z denotes —$(CH_2)_m$—$CR^2R^3$—$(CH_2)_n$—,
$R^2$ denotes hydrogen or —$(CH_2)_s$—O—$(CH_2)_p$—$SO_3^-M^+$, —$(CH_2)_p$—$SO_3^-M^+$ or —$(CH_2)_s$—O—$(CH_2)_p$—$CHR^4$—$SO_3^-M^+$,
$R^3$ denotes —$(CH_2)_s$—O—$(CH_2)_p$—$SO_3^-M^+$, —$(CH_2)_p$—$SO_3^-M^+$ or —$(CH_2)_s$—O—$(CH_2)_p$—$CHR^4$—$SO_3^-M^+$,
$M^+$ denotes a cation,
m, n are identical or different and denote an integer from 0 to 3,
$R^4$ denotes hydrogen a methyl group or an ethyl group;
s denotes an integer from 0 to 10 and
p denotes an integer from 1 to 18.

Very particularly preferred monomers of the structural formula (I) are those in which
X, Y denote O,
Z denotes —$(CH_2)$—$CR^2R^3$—$(CH_2)_n$—,
$R^2$ denotes hydrogen,
$R^3$ denotes —$(CH_2)_s$—O—$(CH_2)_p$—$SO_3^-M^+$, —$(CH_2)_p$—$SO_3^-M^+$, or —$(CH_2)_s$—$(CH_2)_p$—$CH(CH_3)$—$SO_3^-M^+$ or —$(CH_2)_s$—O—$(CH_2)_p$—$CH(CH_2CH_3)$—$SO_3^-M^+$,
$M^+$ denotes $Na^+$ or $K^+$,
n denotes 0 or 1,
s denotes 0 or 1 and
p denotes 2, 3, 4 or 5.

Suitable Examples of self-doped polymers are disclosed in WO-A-2014/048562 and in US-A-2015/0337061. Concrete examples of very particularly preferred self-doped conductive polymers include poly(4-[(2,3-dihydrothieno[3, 4-b]-[1,4]dioxin-2-yl)methoxy]propane-1-sulfonic acid), poly(4-[(2,3-dihydrothieno[3,4-b][1,4]dioxin-2-yl) methoxy]butane-1-sulfonic acid) (PEDOT-S), poly(4-[(2,3-dihydrothieno[3,4-b][1,4]dioxin-2-yl)methoxy]butane-2-sulfonic acid) or a mixture thereof.

According to a second preferred embodiment of the polythiophenes which may be used for the formation of the solid electrolyte layer the polythiophenes are foreign-doped polythiophenes that preferably comprise monomeric or polymeric counterions to balance the positive charges, the latter also being referred to hereinafter as polyanions. Thus, according to a preferred embodiment of the capacitor according to the present invention the conductive polymer in the solid electrolyte layer is a cationic polymer that comprises a polymeric anion serving as a counter-ion for the polythiophene.

Polymeric anions are preferred over monomeric anions, since they contribute to film formation and, owing to their size, lead to thermally more stable, electrically conductive films. Polymeric anions here may, for example, be anions of polymeric carboxylic acids, such as polyacrylic acids, polymethacrylic acid or polymaleic acids, or polymeric sulfonic acids, such as polystyrenesulfonic acids and polyvinylsulfonic acids. These polycarboxylic and -sulfonic acids may also be copolymers of vinylcarboxylic and vinylsulfonic acids with other polymerizable monomers, such as acrylic esters and styrene.

A preferred polymeric anion in the conjugated polymer b) is an anion of a polymeric carboxylic or sulfonic acid. A particularly preferred polymeric anion is the anion of polystyrenesulfonic acid (PSS) or a derivative thereof.

The molecular weight of the polyacids which afford the polyanions is preferably 1000 to 2000000, more preferably 2000 to 500000. The polyacids or alkali metal salts thereof are commercially available, for example polystyrenesulfonic acids and polyacrylic acids, or else are preparable by known processes (see, for example, Houben Weyl, Methoden der organischen Chemie [Methods of Organic Chemistry], vol. E 20 Makromolekulare Stoffe [Macromolecular Substances], part 2, (1987), p. 1141 ff.).

Polymeric anion(s) and electrically conductive polymers may be present in the dispersion a) especially in a weight ratio of 0.5:1 to 50:1, preferably of 1:1 to 30:1, more preferably 2:1 to 20:1. The weight of the electrically conductive polymers corresponds here to the initial weight of the monomers used, assuming that there is full conversion in the polymerization.

The monomeric anions used are, for example, those of $C_1$-$C_{20}$-alkanesulfonic acids, such as those of methanesulfonic acid, ethanesulfonic acid, propanesulfonic acid, butanesulfonic acid or higher sulfonic acids such as dodecanesulfonic acid, of aliphatic perfluorosulfonic acids, such as trifluoromethanesulfonic acid, perfluorobutanesulfonic acid or perfluorooctanesulfonic acid, of aliphatic $C_1$-$C_{20}$-carboxylic acids such as 2-ethylhexylcarboxylic acid, of aliphatic perfluorocarboxylic acids, such as trifluoroacetic acid or perfluorooctanoic acid, and aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids such as camphorsulfonic acid, or tetrafluoroborates, hexafluorophosphates, perchlorates, hexafluoroantimonates, hexafluoroarsenates or hexachloroantimonates. Preferred monomeric anions are the anions of p-toluenesulfonic acid, methanesulfonic acid or camphorsulfonic acid.

A concrete example of very particularly preferred foreign-doped conductive polymer is a complex of poly(3,4-ethylenedioxythiophene) and polystyrenesulfonic acid (PEDOT/PSS).

For the formation of the solid electrolyte layer a solution or dispersion comprising the conductive polymer, such as a PEDOT/PSS-dispersion or a PEDOT-S-solution, can be introduced into the electrode body, followed by an at least partial removal of the solvent or dispersant for the formation of a solid electrolyte layer. This step can be repeated for several times until the desired thickness of the solid electrolyte layer is obtained. Moreover, it is also possible to form a solid electrolyte layer by polymerizing the monomers used to prepare the conductive polymer, such as 3,4-ethylenedioxythiophene, within the electrode body in a so-called in situ-polymerization process. It may also be advantageous to use a combination of a foreign-doped polythiophene, such as PEDOT/PSS, and a self-doped polythiophene, such as PEDOT-S, for the formation of a solid electrolyte layer as this is disclosed, for example, in WO-A-2014/048562.

According to a particularly preferred embodiment of the capacitor according to the present invention, the solid electrolyte layer comprises a first solid electrolyte layer that follows the dielectric layer and second solid electrolyte layer that follows the first solid electrolyte layer, wherein the first and the second solid electrolyte layer both comprise a conductive polymer as the solid electrolyte material. The second solid electrolyte layer serves as a polymeric outer layer as it is disclosed, for example, in US-A-2007/171597. Preferably, both solid electrolyte layers comprise a self- or foreign doped polythiophene, such as PEDOT, PEDOT/PSS, PEDOT-S or a mixture thereof as the conductive polymer.

In this context it is also preferred to cover the first solid electrolyte layer with a primer compound before applying the second solid electrolyte layer in order to improve the coverage of the first solid electrolyte layer with the polymeric outer layers. Suitable primers and approaches of how to apply such a primer are, for example, disclosed on pages 7-14 WO-A-2010/089111 (where the primer compounds are referred to as "crosslinker e)"), on pages 12-15 in WO-A-2015/181347 (where the primer compounds are referred to as "primer compound e)") or on pages 11-14 in WO-A2015/181348 (where the primer compounds are referred to as combinations of "a monofunctional amines and at least one carboxylic acid")

Metal Ion Migration Inhibitor

The capacitor according to the present invention is characterized in that it comprises at least one metal ion migration inhibitor. A "metal ion migration inhibitor" in the sense of the present invention is preferably any compound that is able to form a chelate-complex, preferably a water-insoluble chelate-complex, with copper ions ($Cu^{2+}$ or $Cu^+$).

According to a preferred embodiment of the capacitor according to the present invention the at least one metal ion migration inhibitor is selected from the group consisting of azoles or derivatives thereof and azines or derivatives thereof. An "azole" in the sense of the present invention is preferably any compound that comprises a five-membered aromatic heterocyclic ring system containing a nitrogen atom and at least one other non-carbon atom (i.e. nitrogen, sulfur, or oxygen) as part of the ring system. A derivative of an azole preferably is any compound in which one or more hydrogen atoms is/are substituted by a residue such as a $C_1$-$C_{20}$-alkyl group, a hydroxy group, a halogen atom, an amino group or a carboxy group. An "azine" in the sense of the present invention is either any condensation-product that is obtainable when reacting a hydrazine with a ketone or an aldehyde or any aromatic compound that comprises a 6-membered aromatic heterocyclic ring system containing at least one nitrogen. A derivative of an aromatic azine preferably is any compound in which one or more hydrogen atoms is/are substituted by a residue such as a $C_1$-$C_{20}$-alkyl group, a hydroxy group, a halogen atom, an amino group or a carboxy group. According to a particularly preferred embodiment of the capacitor according to the present invention the at least one metal ion migration inhibitor is 5-methyl-1H-benzotriazole.

Suitable migration inhibitors are
azoles, such as 4-methylimidazole, 4-methyl-5-imidazole-carbaldehyde, ethyl-4-methyl-imidazolecarboxylate, 4-methyl-1(4-methoxy-phenyl)imidazole, benzimidazole, (mercaptobenzimidazole) pyrazole, 2-undecylimidazol, poly-N-vinylimidazole, 1,2,3-triazole, 1,2,4-triazole, 5-methyl-1H-benzotriazole, tetrazole, pentazole, oxazole, isoxazole, 1,2,3-oxadiazole, 1,2,4-oxadiazole, 1,2,5-oxadiazole, 1,3,4-oxadiazole, thiazole, isothiazole, 1,2,3-thiadiazole, 1,2,4-thiadiazole, 1,2,5-thiadiazole, 1,3,4-thiadiazole, 2-amino-5-ethylthio-1,3,4-thiadiazole, 2-amino-5-ethyl-1,3,4-thiadiazole, 3-amino-5-methyl-thio-1,2,4-triazole, 1-(p-tolyl)-4-methylimidazole, 1-phenyl-4-methylimidazole, 4-methyl-5-hydroxymethylimidazole, (2-mercapto-1-methylimidazole), 5-mercapto-1-phenyl-1H-tetrazole, 2-(3,5-di-ter-butyl-2-hydroxyphenyl) benzotriazole, bismuthiol (1,5-dimercapto-1,3,4-thiadiazole), benzoxazole, 2-ethyl-4-methylimidazole, 1-allylimidazole, 4-methyl-2-phenylimidazole, 1-propylimidazole or a derivative of these azoles, azines, such as aromatic hydrazines, oxines, pyridines, pyridazine, pyrimidine, pyrazine, triazone, tetrazine or derivatives of these azines, for example pyrazine-2,3-dicarboxamide, pyridine-2-amine, 3-amino-pyrazine2-carboxylic acid, pyridine-2,3-diamine, pyrazine-2-amine, 2-(3-phenyl-4,5-dihydro-1H-pyrazol-5-yl) pyridine, 2-(3-phenyl-4,5-dihydro-1,2-oxazol-5-yl)-pyridine,1,2-bis(4-chloro-benzy-lidene)azine, 2-methyl-8-quinolinole, allopurinol (1H-Pyrazolo[3,4-d]pyrimidin-4-one), 2-amino-5-methylpyridine, benzoguanamine, 2,3-dimethylpyrazine, thiocyanuric acid or a derivative of these azines, amines, such as ethanolamine, ethylamine, butylamine, isopropylamine, triethanolamine, aniline, benzylamine, octylamine, 2-ethylhexylamine, (N-(2-furfuryl)-p-toluidine), (N-(5-chloro-2-furfuryl)-p-toluidine), (N-(5-bromo-2-furfuryl)-p-toluidine), (N-(5-nitro-2-furfuryl)-p-toluidine), (N-(5-methyl-2-furfuryl)-p-toluidine), N-methyl-p-toluidine, 2-(3-methoxyphenyl) ethylamine or 2-ethylhexylamine.

Particularly preferred metal ion migration inhibitor are 1,2,4-triazole and 5-methyl-1H-benzotriazole or derivatives thereof, wherein 5-methyl-1H-benzotriazole is most preferred.

The metal migration inhibitors are preferably applied in the form of a liquid composition that comprises the metal-ion migration inhibitor, optionally a solvent or dispersant (particularly if the inhibitor itself is not a liquid at room temperature) and optionally one or more additives selected from the group consisting of surfactants, binders, cross-linkers, viscosity modifiers and pH-regulators.

Test Methods

For the determination of the copper-migration, the experimental set-up has been used that is shown in FIGS. 7 and 8.

Experimental SETUP I (FIG. 7):

A glass-plate 112 of size 25 mm×100 mm is used as substrate. A thin film of polyimide comprising an arrow-shaped opening is deposited onto the substrate 112. Some drops of a solid electrolyte dispersion are introduced into the opening. The polyimide-mask is removed after drying the dispersion leaving an arrow-shaped conductive polymer layer 113 (miming the solid electrolyte layer) on the substrate. An arrow-shaped copper-film 114 is glued onto the substrate 112. The tip of the copper-tape 114 and the tip of the conductive polymer layer 113 are facing each other. The distance between the two tips is set to 1 mm. A PTFE-frame 115 is glued onto the substrate 112 whereas the two tips are positioned in the center of the frame. The frame 115 is filled with 50-100 µl deionized water 116 (miming moisture that may accumulate during operation of the capacitor in humid atmosphere). A voltage of 20 VDC is applied between the conductive polymer layer and the copper-tape whereas the copper-tape 114 is set as the anode and the arrow-shaped conductive polymer layer 113 is set as the cathode. The current is monitored over time after applying the voltage.

Experimental Setup II (FIG. 8):

The Experimental Setup II that follows Experimental Setup I with the difference that the conductive polymer layer is replaced by a tantalum capacitor. One edge of the tantalum capacitor 117 is positioned adjacent to the tip of the copper-tape 114 in distance of 1 mm. A PTFE-frame 115 is glued onto the substrate 112 whereas the tantalum capacitor 117 and tip of the copper-tape 114 are positioned in the center of the frame. The frame is filled with deionized-water 116. A voltage of 20 VDC is applied between the solid electrolyte layer of the tantalum capacitor 117 and the copper-tape 114, whereas the copper-tape is set as the anode and the solid electrolyte layer is set as the cathode. The current is monitored over time after applying the voltage.

The Figures and Examples which follow serve to illustrate the invention by way of example and should not be interpreted as a restriction.

EXAMPLES

Preparation Example 1 (Synthesis of a Conductive Polymer)

1736 g of deionized water and 660 g of an aqueous polystyrenesulphonic acid solution having an average molecular weight of 70000 g/mol and a solids content of 3.8 wt.-% were initially introduced into a 5 l glass reactor with a stirrer and thermometer. The reaction temperature was kept between 20 and 25° C. 10.2 g of 3,4-ethylenedioxythiophene were added, while stirring. The solution was stirred for 30 minutes. 0.06 g of iron(III) sulphate and 19 g of sodium persulphate were then added and the solution was stirred for a further 24 hours. After the reaction had ended, for removal of inorganic salts 200 ml of a strongly acid cation exchanger and 500 ml of a weakly basic anion exchanger were added and the solution was stirred for a further 2 h. The ion exchanger was filtered off.

Preparation Example 2 (Preparation of a Conductive Polymer for a First Solid Electrolyte Layer)

Part of the poly(3,4-ethylenedioxythiophene)/polystyrenesulphonate dispersion from Preparation Example 1 was homogenized with a high-pressure homogenizer ten times under a pressure of 1500 bar.

90 g of this PEDOT/PSS dispersion were stirred with 10 g of dimethylsulphoxide.

Preparation Example 3 (Preparation of a Conductive Polymer for a Second Solid Electrolyte Layer)

160 g of the dispersion from Preparation Example 1, 28 g of water, 6 g of a sulpho-polyester and 8 g of dimethylsulphoxide were mixed intensively for one hour in a glass beaker with a stirrer.

Preparation Example 4 (Preparation of a Primer Solution)

4.0 g of p-toluenesulphonic acid monohydrate, 1.7 g of 1,10-diaminodecane and 95.5 g of water were mixed intensively in a glass beaker with a stirrer.

Preparation Example 5 (Production of an Electrode Body for a Tantalum Electrolytic Capacitor)

Tantalum powder having a specific capacitance of 70000 CV/g was pressed to pellets with inclusion of a tantalum wire and sintered in order to form a porous electrode body having dimensions of 1.5 mm×2.9 mm×4.0 mm. 5 of these porous electrode bodies were anodized in a phosphoric acid electrolyte at 30 V to form a dielectric, in order to obtain capacitor bodies Preparation Example 6 (Production of Capacitors)

Capacitor bodies from Preparation Example 5 were impregnated in the composition from Preparation Example 2 for 1 min. Thereafter, drying was carried out at 120° C. for 10 min. The impregnation and drying were carried out nine further times. The capacitor body was then impregnated in the dispersion from Preparation Example 3. Thereafter, drying was carried out at 120° C. for 10 min.

The capacitor bodies were then impregnated in the solution from Preparation Example 4. Thereafter, drying was carried out at 120° C. for 10 min. The capacitor bodies were then impregnated in the dispersion from Preparation Example 3. Thereafter, drying was carried out at 120° C. for 10 min.

The capacitor bodies were then impregnated in the solution from Preparation Example 4. Thereafter, drying was carried out at 120° C. for 10 min. The capacitor bodies were then impregnated in the dispersion from Preparation Example 3. Thereafter, drying was carried out at 120° C. for 10 min.

Preparation Example 7 (Production of Capacitors)

Capacitor bodies from Preparation Example 5 were impregnated in solution consisting of one part by weight of 3,4-ethylenedioxythiophene and 20 parts by weight of a 40 wt. % ethanolic solution of iron(III) p-toluenesulfonate.

The impregnated capacitor bodies were then dried at room temperature (20° C.) for 30 min. Thereafter, they were heat-treated at 50° C. in a drying cabinet for 30 min. The capacitor bodies were then washed in a 2 wt. % aqueous solution of p-toluenesulfonic acid for 60 min. The capacitor bodies were re-formed in a 0.25 wt. % aqueous solution of p-toluenesulfonic acid for 30 min and then rinsed in distilled water and dried. The impregnation, drying, heat treatment and re-forming described were carried out a further two more times with the same capacitor bodies.

The capacitor body was then impregnated in the dispersion from Preparation Example 3. Thereafter, drying was carried out at 120° C. for 10 min.

The capacitor bodies were then impregnated in the solution from Preparation Example 4. Thereafter, drying was carried out at 120° C. for 10 min. The capacitor body was then impregnated in the dispersion from Preparation Example 3. Thereafter, drying was carried out at 120° C. for 10 min.

The capacitor bodies were then impregnated in the solution from Preparation Example 4. Thereafter, drying was carried out at 120° C. for 10 min. The capacitor body was then impregnated in the dispersion from Preparation Example 3. Thereafter, drying was carried out at 120° C. for 10 min.

Preparation Example 8 (Production of Capacitors)

Capacitor bodies from Preparation Example 5 were impregnated in solution consisting of one part by weight of 3,4-ethylenedioxythiophene and 20 parts by weight of a 40 wt. % ethanolic solution of iron(III) p-toluenesulfonate.

The impregnated capacitor bodies were then dried at room temperature (20° C.) for 30 min. Thereafter, they were heat-treated at 50° C. in a drying cabinet for 30 min. The capacitor bodies were then washed in a 2 wt. % aqueous solution of p-toluenesulfonic acid for 60 min. The capacitor bodies were re-formed in a 0.25 wt. % aqueous solution of p-toluenesulfonic acid for 30 min and then rinsed in distilled water and dried. The impregnation, drying, heat treatment and re-forming described were carried out a further five more times with the same capacitor bodies.

Preparation Example 9 (Production of Capacitors)

Capacitor bodies from Preparation Example 5 were impregnated in solution consisting of one part by weight of 3,4-ethylenedioxythiophene and 20 parts by weight of a 40 wt. % ethanolic solution of iron(III) p-toluenesulfonate.

The impregnated capacitor bodies were then dried at room temperature (20° C.) for 30 min. Thereafter, they were heat-treated at 50° C. in a drying cabinet for 30 min. The capacitor bodies were then washed in a 2 wt. % aqueous solution of p-toluenesulfonic acid for 60 min. The capacitor bodies were re-formed in a 0.25 wt. % aqueous solution of p-toluenesulfonic acid for 30 min and then rinsed in distilled water and dried. The impregnation, drying, heat treatment and re-forming described were carried out a further 2 more times with the same capacitor bodies. The capacitor bodies were then placed in an electrochemical cell containing a 0.05 molar solution of 3,4-ethylenedioxythiophene and 0.1 molar tetrabutylammonium tetrafluoroborat in acetonitrile. A positive current of 2 mA was applied for 2000 s to the outside of the capacitor body. Thus, the capacitor body was plated with a layer of poly(3,4-ethylenedioxythiophene). Afterwards the capacitor body was washed in acetonitrile and dried.

Example 1

The dispersion of Preparation Example 3 was mixed with following metal ion migration inhibitors, applied to the Experimental Set-up I and dried for at 120° C. for 10 min.

TABLE 1

| Example | metal ion migration inhibitor | Amount |
| --- | --- | --- |
| 1a | none | |
| 1b | 1,2,4-triazole | 1 wt.-% |
| 1c | 1,2,4-triazole | 5 wt.-% |
| 1d | 5-methyl-1H-benzotriazole | 0.3 wt.-% |

The copper-migration is determined by means of the Experimental Setup I that has been described above:

TABLE 2

| Example | Current after 1 minute | Current after 3 minutes |
| --- | --- | --- |
| 1a | 0.066 mA | 0.276 mA |
| 1b | 0.028 mA | 0.160 mA |
| 1c | 0.020 mA | 0.019 mA |
| 1d | 0.013 mA | 0.013 mA |

Copper dendrite growth was observed from the conductive polymer layer towards the copper tape. The absolute current level and the increase of current level over time was related to the amount of copper dendrites and the speed of dendrite formation. Metal ion migration inhibitors in the conductive polymer layer in Example 1b, 1c and 1d could reduce copper dendrite formation significantly compared to Example 1a having no metal migration inhibitor.

Comparison Example 1

Capacitors were prepared according to Preparation Example 6.

From the thus obtained capacitor bodies the copper-migration is determined by means of the Experimental Setup II that has been described above. The time when the current increased to 2 mA was measured. Results are found in Table 3.

Example 2

Capacitors were prepared according to Preparation Example 6 except that 0.3 wt. % of 5-methyl-1H-benzotriazole was introduced as metal inhibitors into the conductive polymer dispersion of Preparation Example 3. From the thus obtained capacitor bodies the copper-migration is determined by means of the Experimental Setup II that has been described above. The time when the current increased to 2 mA was measured. Results are found in Table 3.

Example 3

Capacitors were prepared according to Preparation Example 6 except that except that 3 wt.-% of 5-methyl-1H-benzotriazole was introduced as metal inhibitors into the conductive polymer dispersion of Preparation Example 4. From the thus obtained capacitor bodies the copper migration is determined by means of the Experimental Setup II that has been described above. The time when the current increased to 2 mA was measured. Results are found in Table 3.

Example 4

Capacitors were prepared according to Preparation Example 6. After preparation the capacitor bodies were dipped into an aqueous solution of 0.3 wt.-% 5-methyl-1H-benzotriazole for 1 min and dried at 120° C. for 10 min afterwards. From the thus obtained capacitor bodies the copper-migration is determined by means of the Experimental Setup II that has been described above. The time when the current increased to 2 mA was measured. Results are found in Table 3.

Example 5

Capacitors were prepared according to Preparation Example 7. After preparation the capacitor bodies were dipped into an aqueous solution of 0.3 wt.-% 5-methyl-1H-benzotriazole for 1 min and dried at 120° C. for 10 min afterwards. From the thus obtained capacitor bodies the copper-migration is determined by means of the Experimental Setup II that has been described above. The time when the current increased to 2 mA was measured. Results are found in Table 3.

Example 6

Capacitors were prepared according to Preparation Example 8. After preparation the capacitor bodies were dipped into an aqueous solution of 0.3 wt.-% 5-methyl-1H-benzotriazole for 1 min and dried at 120° C. for 10 min afterwards. From the thus obtained capacitor bodies the copper-migration is determined by means of the Experimental Setup II that has been described above. The time when the current increased to 2 mA was measured. Results are found in Table 3.

Example 7

Capacitors were prepared according to Preparation Example 9. After preparation the capacitor bodies were dipped into an aqueous solution of 0.3 wt.-% 5-methyl-1H-benzotriazole for 1 min and dried at 120° C. for 10 min afterwards. From the thus obtained capacitor bodies the copper-migration is determined by means of the Experimental Setup II that has been described above. The time when the current increased to 2 mA was measured. Results are found in Table 3.

TABLE 3

| Example | Time when 2 mA current is measured |
| --- | --- |
| Comparison Example 1 | 10 s |
| Example 2 | 210 s |
| Example 3 | >250 s |
| Example 4 | 50 s |
| Example 5 | 50 s |
| Example 6 | 60 s |
| Example 7 | 40 s |

Copper dendrite growth could be retarded significantly by metal migration inhibitors in capacitors of Example 2 to 7. A high DC current level of 2 mA was observed without metal migration inhibitor already after 10 s which is due to a fast copper dendrite growth. The time to reach 2 mA was prolonged significantly by adding metal ion migration inhibitors to the capacitors of Example 2 to 7.

As can be seen, the incorporation of a metal ion migration inhibitor such as 1,2,4-triazole or 5-methyl-1H-benzotriazole in a solid electrolyte layer, particularly into the polymeric outer layer of solid electrolyte capacitor that comprises conductive polymers such as polythiophenes as the solid electrolyte material and a copper-containing anode lead frame leads to a significant reduction of the copper migration into the solid electrolyte layer, as can be seen from the reduced current that is measured in the experimental set up shown in FIG. 7 and FIG. 8. As can also be seen from the results shown above, 5-methyl-1H-benzotriazole is even more effective than 1,2,4-triazole.

Example 8

0.3% of the metal ion migration inhibitors in table 4 were mixed into the dispersion that is obtained in Preparation Example 3, applied to the Experimental Setup I (with the slight modification that the distance between the two tips was set to 2 mm instead of 1 mm) and dried for at 120° C. for 10 min. The copper-migration is determined by means of the modified Experimental Setup I.

TABLE 4

| | current in mA at 20 V after | | |
| --- | --- | --- | --- |
| Metal ion migration inhibitor | 1 min | 3 min | 5 min |
| none | 0.066 | 0.276 | 0.4 |
| bismuthiol | 0.028 | 0.025 | 0.019 |
| benzoxazole | 0.033 | 0.008 | 0.006 |
| 4-Methyl-2-phenylimidazole | 0.019 | 0.017 | 0.015 |
| allopurinol | 0.028 | 0.031 | 0.03 |
| 2-amino-5-methylpyridine | 0.026 | 0.021 | 0.025 |
| benzoguanamine | 0.028 | 0.016 | 0.014 |
| 2,3-dimethylpyrazine | 0.010 | 0.011 | 0.012 |
| thiocyanuric acid | 0.003 | 0.004 | 0.004 |

Copper dendrite growth was observed from the conductive polymer layer towards the copper tape. The absolute current level and the increase of current level over time was related to the amount of copper dendrites and the speed of dendrite formation. The presence of the metal ion migration inhibitors mentioned in table 4 in the conductive polymer layer can reduce copper dendrite formation significantly compared to a conductive polymer layer that does not comprise any metal migration inhibitor.

Unless otherwise specified in the description or the particular Figure.

Figure 6:
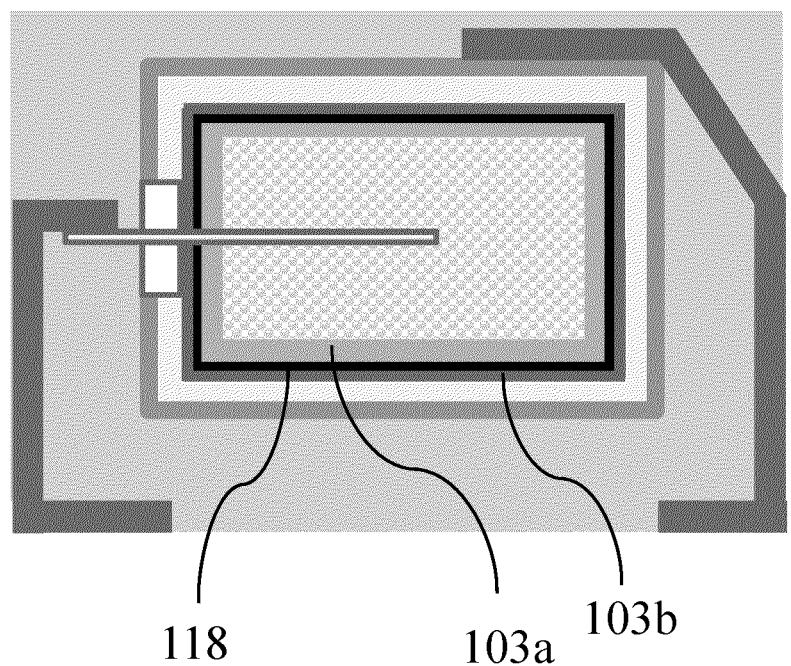
Figure 7:
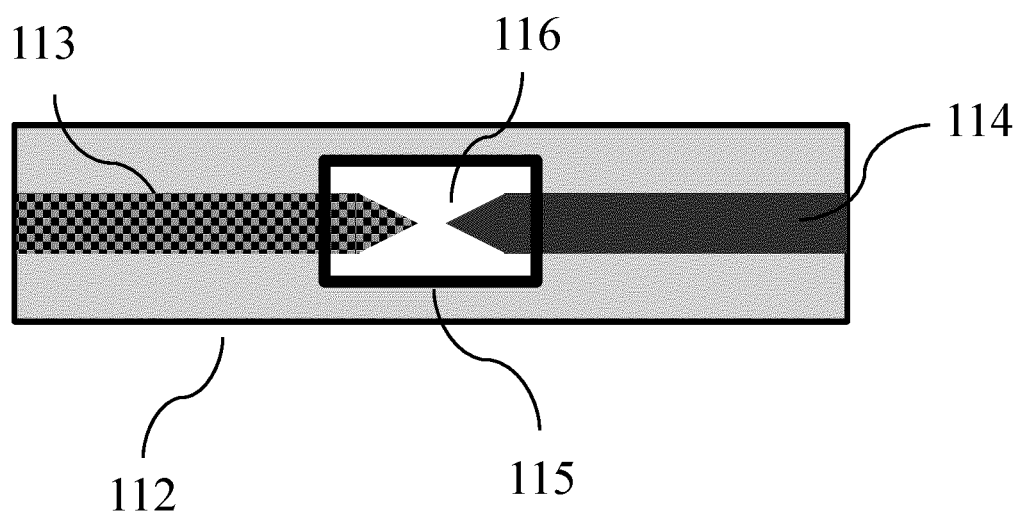
Figure 8:
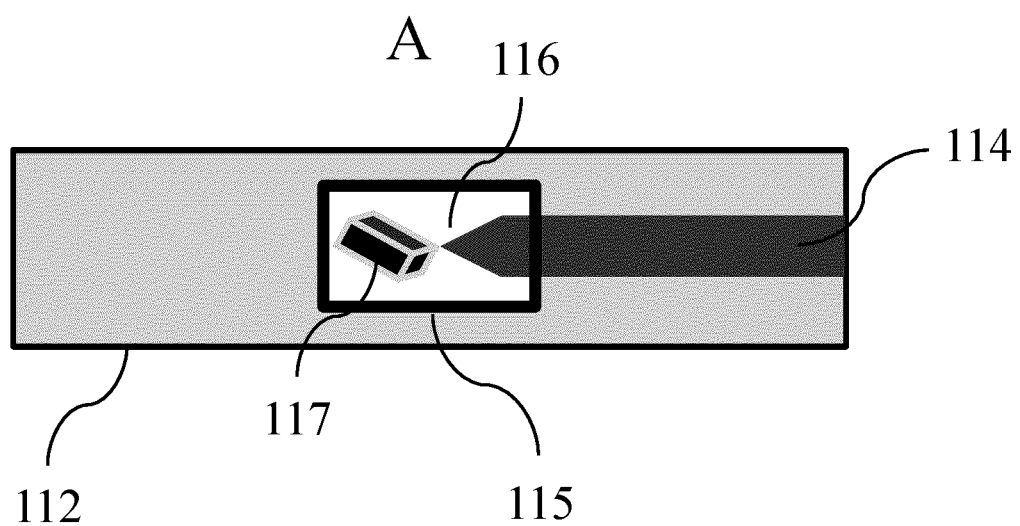
Figure 8:
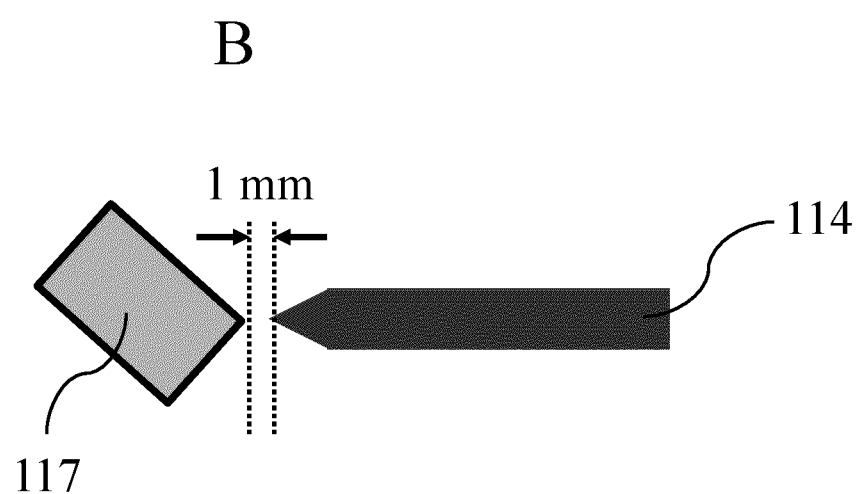

FIG. 6 shows in a cross-sectional view the basic structure of a tantalum capacitor 100 according to the present invention, in which the metal ion migration inhibitor is localized within between the first solid electrolyte layer 103a and the second solid electrolyte layer 103b;

FIG. 7 shows the Experimental Setup I that has been used to determine the copper ion migration;

FIG. 8A,B show the Experimental Setup II that has been used to determine the copper ion migration.

Figure 1:
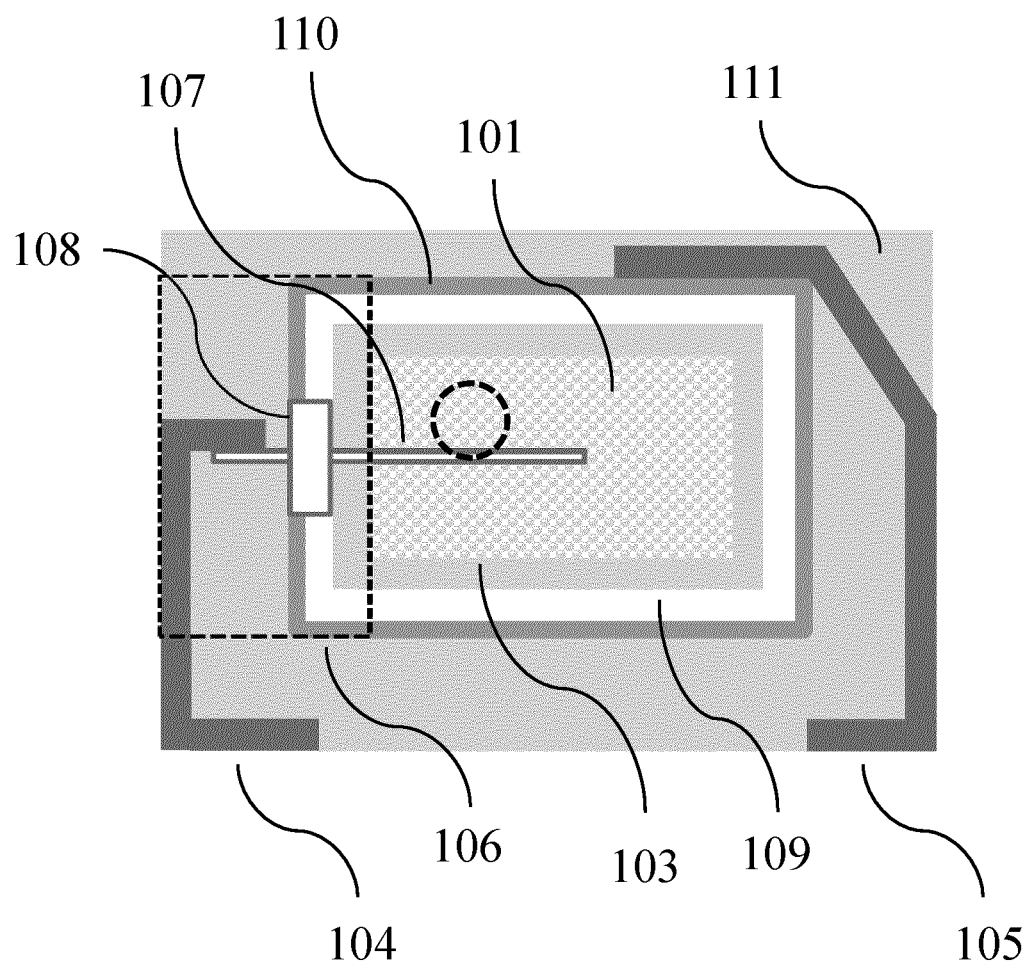
FIG. 1 shows in a cross-sectional view the basic structure of a tantalum capacitor 100 according to the present invention.
Figure 2:
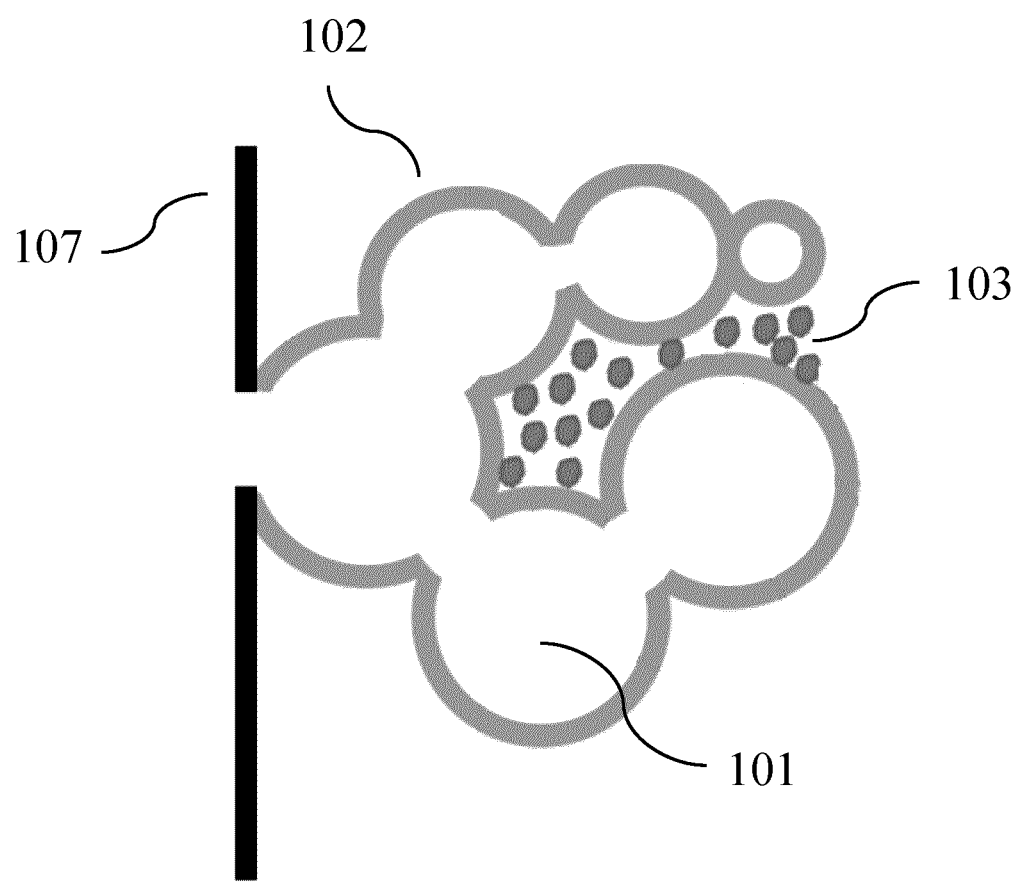
FIG. 2 shows in a cross-sectional and enlarged view the structure of the electrode body 101 within the area of the circle shown in FIG. 1.

FIG. 1 shows in a cross-sectional view the basic structure of a tantalum capacitor 100 according to the present invention. The capacitor comprises an electrode body 101 comprising tantalum as the electrode material, wherein a dielectric layer 102 comprising tantalum oxide as the dielectric material at least partially covers a surface of the electrode body 101 (as this is shown in an enlarged view in FIG. 2). A tantalum wire 107 is introduced into the electrode body 101 to allow an electrical contact of the electrode body 101 with the anode contact 104. The capacitor 100 further comprises a solid electrolyte layer 103 comprising a solid electrolyte material, preferably PEDOT/PSS, PEDOT-S or a mixture thereof, that at least partially covers a surface of the dielectric layer 102. As can also be seen in FIG. 1, the solid electrolyte layer 103 is coated with a carbon layer 109, which in turn is coated with a silver layer 110. The capacitor 100 further comprises an anode contact 104, preferably in the form of an anode lead frame, that—via the tantalum wire 107—is in contact with the electrode body 101, wherein the anode contact 104 comprises copper, metal-plated copper or a copper-containing alloy. A cathode contact 105, also preferably in the form of a cathode lead frame, is also provided that is in contact with the solid electrolyte layer 103 via the carbon layer 109 and the silver layer 110. As also shown in FIG. 1, an insulative layer 108 may be located on at least a part of the surface of the tantalum wire 107 by means of which an electrically conductive contact between the tantalum wire 107 and the solid electrolyte layer 103, the carbon layer 109 and the silver layer 110 is avoided. The capacitor 100 is preferably embedded into a molded case 111.

The dotted box in FIG. 1 indicates the area 106 between the anode contact 104 and the solid electrolyte layer 103 in which the solid electrolyte material is in close proximity to the copper-containing anode contact 104. It is preferred in the capacitor 100 according to the present invention that the at least one metal ion migration inhibitor is localized at least in this area 106 between the anode contact 104 and the solid electrolyte layer 103 or is localized within the solid electrolyte layer 103.

Figure 3:
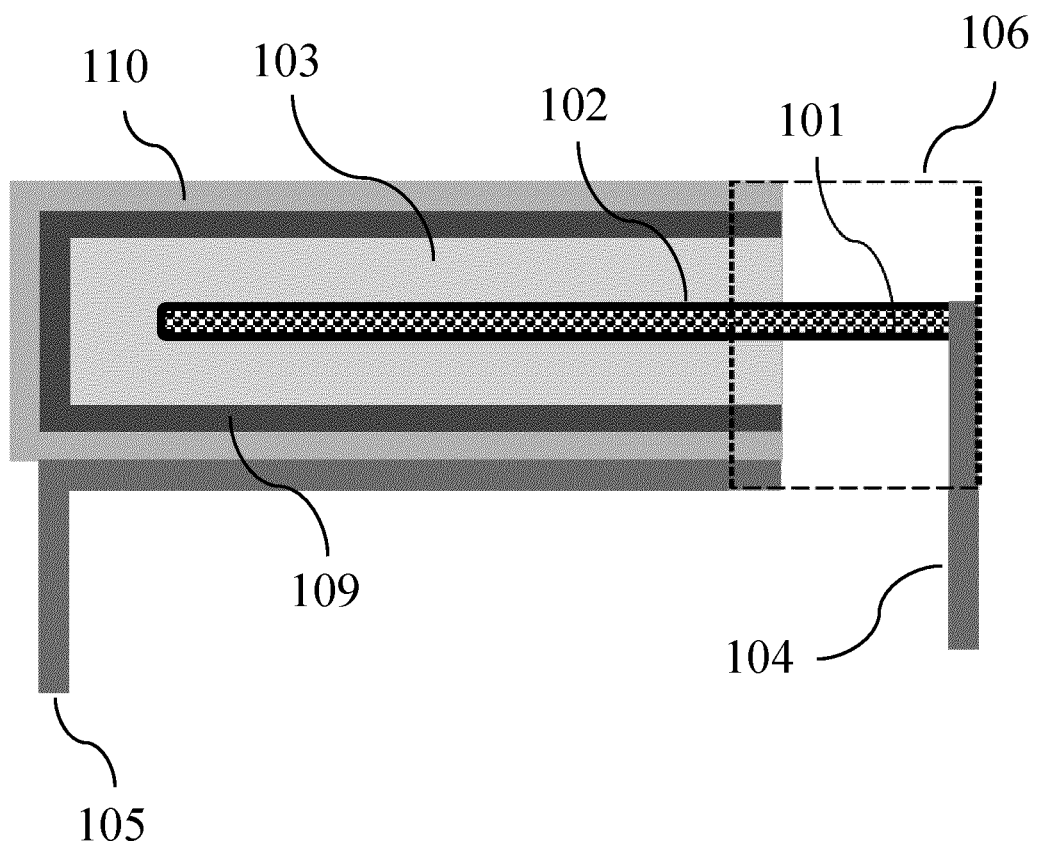
FIG. 3 shows in a cross-sectional view the basic structure of an aluminium capacitor 100 according to the present invention.

FIG. 3 shows in a cross-sectional view the basic structure of an aluminium capacitor 100 according to the present invention. The aluminium capacitor has the same basic structure as the tantalum capacitor 100 shown in FIG. 1, but comprises an aluminium layer, preferably an etched aluminium foil, as the electrode body 101, onto which a layer of aluminium oxide is deposited for the formation of the dielectric layer 102. Furthermore, the aluminium layer is directly contacted with the anode contact 104. In a multilayer aluminium capacitor, several structures shown in FIG. 3 are stacked on top of each other.

Figure 4:
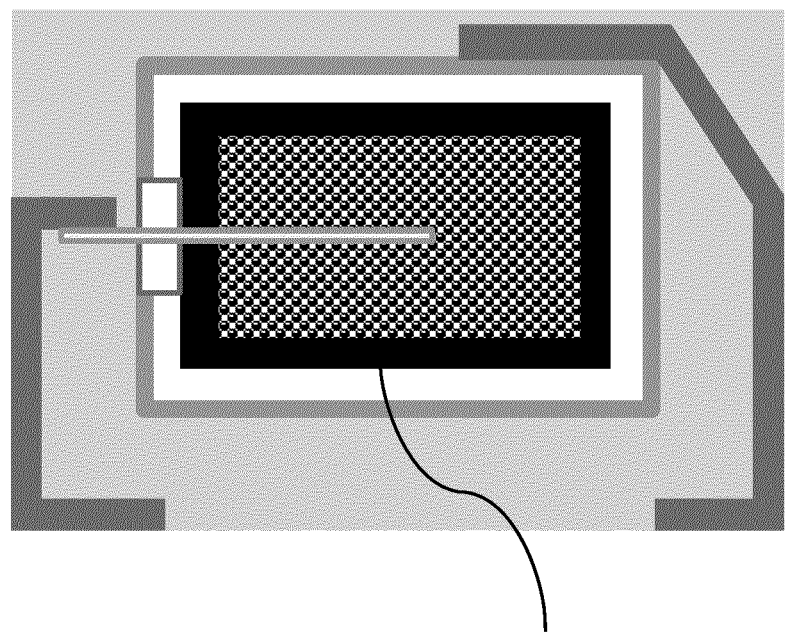
FIG. 4 shows in a cross-sectional view the basic structure of a tantalum capacitor 100 according to the present invention, in which the metal ion migration inhibitor is localized within the solid electrolyte layer 103.
Figure 5:
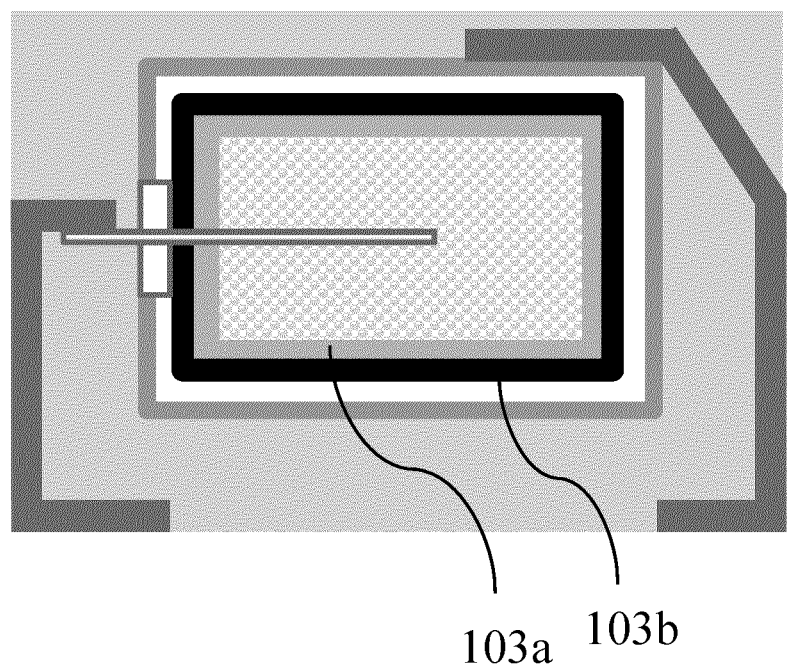
FIG. 5 shows in a cross-sectional view the basic structure of a tantalum capacitor 100 according to the present invention, in which the metal ion migration inhibitor is localized within the second solid electrolyte layer 103b (=polymeric outer layer)

FIGS. 4-6 show different possibilities for the location of the at least one metal ion migration inhibitor within a tantalum capacitor 100 according to the present invention, wherein the location is indicated in black colour.

In FIG. 4 the least one metal ion migration inhibitor is located within the solid electrolyte layer 103. Such a localization can be achieved by using, for the formation of the solid electrolyte layer 103, a solution or dispersion of a conductive polymer, preferably a PEDOT/PSS-dispersion, a PEDOT-S-solution or a combination thereof, wherein this dispersion and/or solution comprises a certain amount of the metal ion migration inhibitor, or by impregnating a solid electrolyte layer 103 that is based on conductive polymers such as PEDOT/PSS or PEDOT-S with a metal ion migration inhibitor (for example by using a solution or dispersion that comprises the metal ion migration inhibitor).

FIG. 5 shows a capacitor 100 in which the solid electrolyte layer comprises a first solid electrolyte layer 103a and a second solid electrolyte layer 103b serving as a polymeric outer layer, wherein the least one metal ion migration inhibitor is located within the second solid electrolyte layer 103b. Such a localization can again be achieved by using, for the formation of the second solid electrolyte layer 103b, a solution or dispersion of a conductive polymer, preferably a PEDOT/PSS-dispersion, that comprises a certain amount of the metal ion migration inhibitor, or by impregnating a second solid electrolyte layer 103b that is based on PEDOT/PSS with a metal ion migration inhibitor.

FIG. 6 also shows a capacitor 100 in which the solid electrolyte layer comprises a first solid electrolyte layer 103a and a second solid electrolyte layer 103b, wherein the least one metal ion migration inhibitor is located in an area between the first and the second solid electrolyte layer 103a,103b. Such a localization can be achieved if, for example, the at least one metal ion migration inhibitor is added into a primer solution that is often used to coat the first solid electrolyte layer 103a with a primer layer 118 before applying the second solid electrolyte layer 103b in order to improve the coverage of the first solid electrolyte layer 103a with the polymeric outer layer 103b (as disclosed in WO-A-2010/089111) or by applying the metal ion migration inhibitor separately on top of the first solid electrolyte layer 103a.

FIG. 7 shows the Experimental Setup I that has been used to determine the copper ion migration. A glass-plate 112 of size 25 mm×100 mm is used as substrate. A thin film of polyimide comprising an arrow-shaped opening is deposited onto the substrate 112. Some drops of a solid electrolyte dispersion are introduced into the opening. The polyimide-mask is removed after drying the dispersion leaving an arrow-shaped conductive polymer layer 113 (miming the solid electrolyte layer) on the substrate. An arrow-shaped copper-film 114 is glued onto the substrate 112. The tip of the copper-tape 114 and the tip of the conductive polymer layer 113 are facing each other. The distance between the two tips is set to 1 mm. A PTFE-frame 115 is glued onto the substrate 112 whereas the two tips are positioned in the center of the frame. The frame 115 is filled with 50-100 µl deionized water 116 (miming moisture that may accumulate during operation of the capacitor in humid atmosphere). A voltage of 20 VDC is applied between the conductive polymer layer and the copper-tape whereas the copper-tape 114 is set as the anode and the arrow-shaped conductive polymer layer 113 is set as the cathode. The current is monitored over time after applying the voltage.

FIGS. 8A and 8B show the Experimental Setup II that follows Experimental Setup I with the difference that the conductive polymer layer is replaced by a tantalum capacitor. One edge of the tantalum capacitor 117 is positioned adjacent to the tip of the copper-tape 114 in distance of 1 mm. A PTFE-frame 115 is glued onto the substrate 112 whereas the tantalum capacitor 117 and tip of the copper-tape 114 are positioned in the center of the frame. The frame is filled with deionized-water 116. A voltage of 20 VDC is applied between the solid electrolyte layer of the tantalum capacitor 117 and the copper-tape 114, whereas the copper-tape 114 is set as the anode and the solid electrolyte layer is set as the cathode. The current is monitored over time after applying the voltage.

LIST OF REFERENCE NUMERALS 100 capacitor according to the invention
101 electrode body
102 dielectric layer
103 solid electrolyte layer
103a first solid electrolyte layer
103b second solid electrolyte layer
104 anode contact, preferably an anode lead frame
105 cathode contact, preferably a cathode lead frame
106 area between the anode contact 104 and the solid electrolyte layer 103
107 tantalum wire
108 insulative layer
109 first conductive layer, preferably carbon layer
110 second conductive layer, preferably silver layer
111 molded case
112 glass substrate
113 conductive polymer layer
114 copper tape
115 PTFE tape
116 deionized-water
117 tantalum capacitor with solid electrolyte layer
118 primer layer

The invention claimed is:

1. A capacitor comprising
   i) an electrode body comprising an electrode material, wherein a dielectric layer comprising a dielectric material at least partially covers a surface of the electrode body;
   ii) a solid electrolyte layer comprising a solid electrolyte material that at least partially covers a surface of the dielectric layer, wherein the solid electrolyte material comprises a conductive polymer;
   iii) an anode contact that is in contact with the electrode body and that comprises copper, metal-plated copper or a copper-containing alloy; and
   iv) a cathode contact that is in contact with the solid electrolyte layer;
wherein the capacitor further comprises at least one metal ion migration inhibitor being able to form a chelate-complex with copper ions, wherein the at least one metal ion migration inhibitor is localized within the solid electrolyte layer or is localized on the surface of the solid electrolyte layer.

2. The capacitor according to claim 1, wherein the solid electrolyte layer comprises a first solid electrolyte layer that follows the dielectric layer and second solid electrolyte layer that follows the first solid electrolyte layer, wherein the first and the second solid electrolyte layer both comprise a conductive polymer as the solid electrolyte material.

3. The capacitor according to claim 2, wherein at least one of the following conditions is fulfilled:
   a) the at least one metal ion migration inhibitor is localized within at least a part of the first solid electrolyte layer;
   b) the at least one metal ion migration inhibitor is localized within at least a part of the second solid electrolyte layer;
   c) the at least one metal ion migration inhibitor is localized on at least a part of the surface of the first solid electrolyte layer that is directed towards the second solid electrolyte layer; and
   d) the at least one metal ion migration inhibitor is localized on at least a part of the surface of the second solid electrolyte layer that faces away from the first solid electrolyte layer.

4. The capacitor according to claim 1, wherein the conductive polymer is a foreign-doped polythiophene, a self-doped polythiophene or a mixture thereof.

5. The capacitor according to claim 1, wherein the at least one metal ion migration inhibitor is selected from the group consisting of azoles or derivatives thereof and azines or derivatives thereof.

6. The capacitor according to claim 5, wherein the azole is 5-methyl-1H-benzotriazole or derivative thereof.

7. A process for the production of a capacitor, comprising the process steps:
   I) providing an electrode body comprising an electrode material, wherein a dielectric comprising a dielectric material covers a surface of this electrode material at least partially;
   II) depositing a solid electrolyte layer comprising a solid electrolyte material onto at least a part of a surface of the dielectric layer, wherein the solid electrolyte material comprises a conductive polymer;
   III) bringing the electrode body in contact with an anode contact that comprises copper, metal-plated copper or a copper-containing alloy; and
   IV) bringing the solid electrolyte layer in contact with a cathode contact;
wherein at least one metal ion migration inhibitor being able to form a chelate-complex with copper ions is introduced into the solid electrolyte layer or is applied onto the surface of the solid electrolyte layer.

8. The process according to claim 7 wherein in process step II) a first solid electrolyte layer is deposited onto at least a part of a surface of the dielectric layer, followed by the deposition of s second solid electrolyte layer onto the first solid electrolyte layer, wherein the first and the second solid electrolyte layer both comprise a conductive polymer as the solid electrolyte material.

9. The process according to claim 8, wherein at least one of the following conditions is fulfilled:
   A) during or after process step II) the at least one metal ion migration inhibitor is introduced into the first solid electrolyte layer;
   B) during or after process step II) the at least one metal ion migration inhibitor is introduced into the second solid electrolyte layer;
   C) during or after process step II) the at least one metal ion migration inhibitor is deposited onto the surface of the first solid electrolyte layer that is directed towards the second solid electrolyte layer;
   D) during or after process step II) the at least one metal ion migration inhibitor is deposited onto the surface of the second solid electrolyte layer that faces away from first solid electrolyte layer.

10. The process according to claim 7, wherein the at least one metal ion migration inhibitor is 5-methyl-1H-benzotriazole or a derivative thereof.

11. A capacitor, obtainable by the process according to claim 7.

12. An electronic circuit comprising a capacitor according to claim 1.

13. The capacitor according to claim 1, wherein the solid electrolyte layer comprises a first solid electrolyte layer that follows the dielectric layer and second solid electrolyte layer that follows the first solid electrolyte layer, wherein the first and the second solid electrolyte layer both comprise a conductive polymer as the solid electrolyte material;

wherein at least one of the following conditions is fulfilled:

a) the at least one metal ion migration inhibitor is distributed throughout the second solid electrolyte layer;

b) the at least one metal ion migration inhibitor is localized on at least a part of the surface of the second solid electrolyte layer that faces away from the first solid electrolyte layer.

14. The process according to claim 7, wherein the deposition of the solid electrolyte layer onto at least a part of a surface the dielectric layer in process step II) comprises the steps of:

contacting the electrode body obtained in process step I) with a liquid composition that comprises the conductive polymer and at least one solvent followed by an at least partial removal of the solvent, or a monomer used to prepare the conductive polymer and an oxidizer followed by an in situ-polymerization of the monomer, or a monomer used to prepare the conductive polymer followed by an electrochemical polymerization, for the formation of the solid electrolyte layer;

and wherein the introduction of the at least one metal ion migration inhibitor into the solid electrolyte layer or the application of the at least one metal ion migration inhibitor onto the surface of this layer is accomplished:

α) by adding the at least one metal ion migration inhibitor into the liquid composition that comprises the conductive polymer or the monomer or the oxidizer used to prepare the conductive polymer;

β) by bringing the solid electrolyte layer into contact with a composition that comprises the at least one metal ion migration inhibitor; or γ) by a combination of approaches α) and β).

\* \* \* \* \*